United States Patent [19]

Kalata

[11] Patent Number: 4,893,262

[45] Date of Patent: Jan. 9, 1990

[54] WEIGH FEEDING SYSTEM WITH SELF-TUNING STOCHASTIC CONTROL

[75] Inventor: Paul R. Kalata, Cherry Hill, N.J.

[73] Assignee: K-Tron International, Inc., Pitman, N.J.

[21] Appl. No.: 344,458

[22] Filed: Apr. 28, 1989

Related U.S. Application Data

[63] Continuation of Ser. No. 174,976, Mar. 29, 1988, abandoned, which is a continuation-in-part of Ser. No. 879,430, Jun. 27, 1986, Pat. No. 4,775,949.

[51] Int. Cl.⁴ .................... G01G 13/00; B67D 5/14
[52] U.S. Cl. .................................. 364/567; 177/59; 177/66; 222/56
[58] Field of Search ............. 364/465, 466, 510, 567, 364/568; 177/59, 60, 63, 64, 66, 71, 114, 119, 121, 122, 123; 340/673; 222/1, 56, 58, 59

[56] References Cited

U.S. PATENT DOCUMENTS

| | | |
|---|---|---|
| Re. 32,101 | 4/1986 | Ricciardi et al. ............... 222/56 |
| 3,116,801 | 1/1964 | Bauder et al. ............... 177/1 |
| 3,463,979 | 8/1969 | Scobie et al. ............... 318/565 |
| 3,481,509 | 12/1969 | Marhauer ............... 222/1 |
| 3,622,767 | 11/1971 | Koepcke ............... 235/150.1 |
| 3,633,009 | 1/1972 | Green et al. ............... 235/151.3 |
| 3,700,490 | 10/1972 | Hiyosi et al. ............... 427/10 |
| 3,767,900 | 10/1973 | Chao et al. ............... 235/150.1 |
| 3,845,370 | 10/1974 | Mantey ............... 318/327 |
| 3,876,871 | 4/1975 | Sinner ............... 364/106 |
| 3,889,848 | 6/1975 | Ricciardi et al. ............... 222/58 |
| 4,167,576 | 4/1980 | Sanchez ............... 235/150.1 |
| 4,301,510 | 11/1981 | Ricciardi et al. ............... 364/567 |
| 4,508,186 | 4/1985 | Sashiki et al. ............... 364/567 |
| 4,524,886 | 6/1985 | Wilson et al. ............... 222/58 |
| 4,528,918 | 7/1985 | Sato et al. ............... 110/347 |
| 4,544,280 | 10/1985 | Mitsukawa ............... 364/567 |
| 4,545,242 | 10/1985 | Chan ............... 73/152 |
| 4,577,270 | 3/1986 | Sugano et al. ............... 364/151 |
| 4,716,768 | 1/1988 | Dávid et al. ............... 364/510 |
| 4,782,454 | 11/1988 | Nakamura ............... 364/567 |

FOREIGN PATENT DOCUMENTS 1255541 12/1971 United Kingdom .

OTHER PUBLICATIONS

Paul R. Kalata, "The Tracking Index: A Generalized Parameter for $\alpha-\beta$ and $\alpha-\beta-\gamma$ Target Trackers", IEEE Transactions on Aerospace and Electronic Systems, vol. AES-20, No. 2, Mar. 1984, pp. 174-182.

(List continued on next page.)

Primary Examiner—Parshotam S. Lall
Assistant Examiner—Brian M. Mattson
Attorney, Agent, or Firm—Oliff & Berridge

[57] ABSTRACT

A weigh feeding system using a stochastic controller wherein the weight of material is sensed, and an estimate of the mass flow state of the material being discharged is created by use of a Kalman filter process. Plant noise processes and measurement noise processes, which affect the measured weight signal, are modeled as stochastic processes and are used, in combination with the sensed weight signal, to calculate the estimated mass flow state. The noise model is modified to account for disturbances. The estimated mass flow state signal is used to calculate a motor feedback signal which, in turn, is used to control the speed of the discharge apparatus. In this manner, the mass flow of the material actually being discharged is driven to a desired mass flow with minimum error variance in the presence of unavoidable plant and measurement noise. Self-tuning of the stochastic controller is employed to accurately determine parameters of the plant noise and measurement noise processes, and to compensate the controller for control dynamics. Feedback control tuning is also employed to monitor the set-point error in order to achieve quick response while maintaining smooth steady-state set point control.

8 Claims, 16 Drawing Sheets

U.S. PATENT DOCUMENTS

T. J. Williams et al., "Progress in Direct Digital Control", Instrument Society of America, Pittsburgh, 1969, pp. 53, 69, 92, 93, 255.

Emanuel S. Savas, Ph. D., "Computer Control of Industrial Processes", 1965, pp. 12–15.

J. S. Meditch, "Stochastic Optimal Linear Estimation and Control", Boeing Scientific Research Laboratories, pp. 1–394, 1969.

Andrew P. Sage et al., "Optimum Systems Control" Second Edition, 1977, pp. 1–413.

Andrew P. Sage et al., "Estimation Theory with Applications to Communications and Control", 1971, pp. 1–529.

Robert F. Stengel, "Stochastic Optimal Control", Theory and Application, 1986, pp. 1–638.

Stanley M. Shinners, "Control System Design", 1964, pp. 1–523.

Kalata et al., "Stochastic Control of Loss-in-Weight Feeding Machines," Proceedings IEEE International Symposium on Intelligent Control, Jan. 1987, pp. 495–500.

Friedland, "Estimating Noise Variances by Using Multiple Observes," IEEE Transactions on Aerospace and Electronic Systems, vol. AES-18, No. 4, Jul. 1982, pp. 442–448.

Motor Signal $I_M$

Estimated Mass Flow $\hat{W}_r$ (PPM/t)

Time Period T (SEC)

Cycles

| Cycle | Mass Flow Estimate $\hat{W}_r$ | Motor Signal $I_M$ | Cycle | Mass Flow Estimate $\hat{W}_r$ | Motor Signal $I_M$ |
|---|---|---|---|---|---|
| 1 | 7.3273 | 0 | 52 | -510.33 | -1358 |
| 2 | 0.12521 | -634 | 53 | -508.7 | -1348 |
| 3 | -9.5743 | -1273 | 54 | -501.11 | -1351 |
| 4 | -208.94 | -1545 | 55 | -497.76 | -1353 |
| 5 | -301.31 | -1744 | 56 | -493.46 | -1363 |
| 6 | -393.89 | -1824 | 57 | -488.2 | -1378 |
| 7 | -489.45 | -1803 | 58 | -453.92 | -1448 |
| 8 | -551.21 | -1728 | 59 | -456.82 | -1486 |
| 9 | -583.78 | -1625 | 60 | -490.87 | -1483 |
| 10 | -604 | -1501 | 61 | -525.61 | -1441 |
| 11 | -604.39 | -1387 | 62 | -530.04 | -1411 |
| 12 | -578.79 | -1311 | 63 | -518.83 | -1395 |
| 13 | -540.2 | -1281 | 64 | -527.2 | -1357 |
| 14 | -514.73 | -1271 | 65 | -518.24 | -1345 |
| 15 | -491.44 | -1290 | 66 | -503.2 | -1346 |
| 16 | -477.72 | -1318 | 67 | -499.45 | -1346 |
| 17 | -473.65 | -1348 | 68 | -491.93 | -1359 |
| 18 | -466.81 | -1389 | 69 | -496.28 | -1359 |
| 19 | -470.44 | -1419 | 70 | -502.23 | -1356 |
| 20 | -491.62 | -1418 | 71 | -514.69 | -1333 |
| 21 | -508.46 | -1404 | 72 | -507.06 | -1332 |
| 22 | -511.78 | -1391 | 73 | -491.18 | -1347 |
| 23 | -510.18 | -1381 | 74 | -484.23 | -1366 |
| 24 | -506.19 | -1376 | 75 | -489.15 | -1375 |
| 25 | -500.06 | -1378 | 76 | -487.95 | -1391 |
| 26 | -499.19 | -1378 | 77 | -490.13 | -1400 |
| 27 | -507.11 | -1366 | 78 | -498.05 | -1399 |
| 28 | -480.12 | -1405 | 79 | -492.47 | -1412 |
| 29 | -460.06 | -1453 | 80 | -499.33 | -1406 |
| 30 | -472.58 | -1475 | 81 | -511.81 | -1389 |
| 31 | -513.86 | -1441 | 82 | -516.73 | -1370 |
| 32 | -532.57 | -1404 | 83 | -512.66 | -1358 |
| 33 | -525.7 | -1379 | 84 | -504.37 | -1356 |
| 34 | -517.18 | -1362 | 85 | -488.67 | -1376 |
| 35 | -501.41 | -1368 | 86 | -492.29 | -1379 |
| 36 | -492.74 | -1377 | 87 | -501.31 | -1376 |
| 37 | -494.22 | -1382 | 88 | -500.11 | -1377 |
| 38 | -516.09 | -1353 | 89 | -492.17 | -1389 |
| 39 | -531.49 | -1315 | 90 | -492.37 | -1396 |
| 40 | -552.66 | -1246 | 91 | -489.18 | -1411 |
| 41 | -535.69 | -1220 | 92 | -500.01 | -1404 |
| 42 | -491.65 | -1246 | 93 | -517.3 | -1378 |
| 43 | -468.44 | -1286 | 94 | -510.77 | -1373 |
| 44 | -457.92 | -1337 | 95 | -496.47 | -1381 |
| 45 | -457.12 | -1384 | 96 | -496.55 | -1383 |
| 46 | -456.07 | -1434 | 97 | -501.36 | -1380 |
| 47 | -469.26 | -1461 | 98 | -504.18 | -1374 |
| 48 | -494.12 | -1458 | 99 | -504.31 | -1370 |
| 49 | -520.7 | -1425 | 100 | -500.53 | -1371 |
| 50 | -534.91 | -1383 | 101 | -496.19 | -1377 |
| 51 | -520.95 | -1368 | 102 | -492.92 | -1386 |

Fig. 7

WEIGH FEEDING SYSTEM WITH SELF-TUNING STOCHASTIC CONTROL

This application is a continuation of application Ser. No. 174,976, filed Mar. 29, 1988 and now abandoned, which is a continuation-in-part of Application Ser. No. 879,430, filed June 27, 1986, now U.S. Pat. No. 4,775,949.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention pertains to weight feeding systems.

The present invention uses a Kalman filtering process to develop filtered estimates of the actual weight state and the mass flow state. These filtered estimates are used, in combination with modeling and classification of the plant and measurement noise processes which affect the weight measurements, to control the actual mass flow state. The class of noise is determined, and a stochastic model for each class is created. The estimated mass flow signal is produced based on the measured weight and the stochastic models of the individual noise processes affecting the system. The noise process models are modified according to the magnitude of their effects and probability of occurrence.

The estimated mass flow state signal is then compared with a desired mass flow set-point, and the resultant error signal is used to control a discharge actuator to produce the desired mass flow.

The present invention also employs self-tuning of parameters associated with the noise processes which affect the weight measurements and self-tuning of control parameters in order to compensate the Kalman filter states due to the effects of control dynamics. This noise model tuning and control model tuning allow the Kalman filter to operate optimally. In addition, feedback control tuning is employed to monitor the set point error and to generate adaptive dynamics to achieve a quick response while maintaining a smooth steady-state set point control.

BRIEF DESCRIPTION OF THE DRAWINGS

FIGS. 6A-4F are graphs of the operation of a weigh feeding system according to the present invention.

FIG. 7 is a tubular representation of the graphs of FIGS. 6D and 6E.

DESCRIPTION OF THE PREFERRED EMBODIMENT

In the present weight feeding system, solid or liquid material stored in a hopper or other container is discharged by a conventional discharge actuator such as a screw feeder, conveyor, pump, valve or the like as appropriate. The discharge actuator is driven by an electric motor. The system also includes a weight sensing device, such as a scale, for sensing the weight of the material in the hopper or the material being discharged, and for producing a signal indicative of the sensed weight state. The signal produced by the weight sensing device is applied to a weight signal processor which, in turn, produces a signal which is an estimate of the weight rate state or mass flow state of material being discharged. The estimate of mass flow state is then used, in a feedback loop, to control the motor to drive the estimated mass flow state to a desired set-point mass flow.

Figure 1:
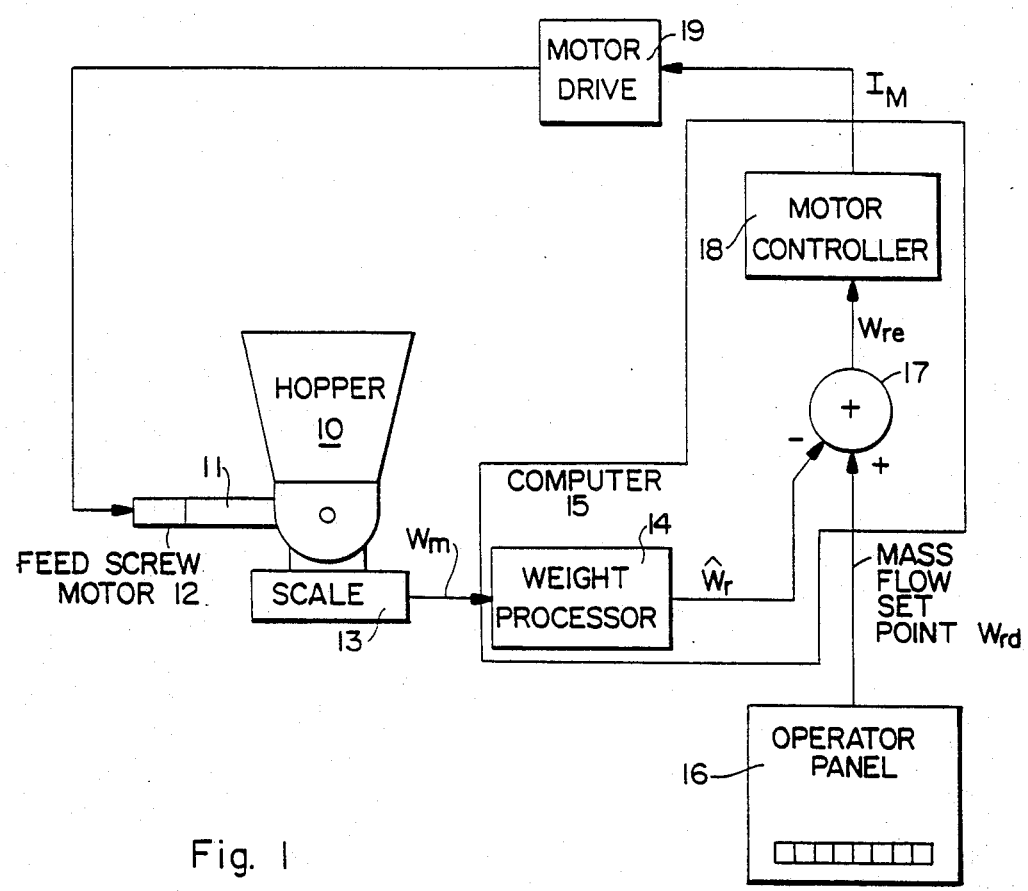
FIG. 1 is a loss-in-weight feeding system embodying the present invention.

Referring to FIG. 1, material stored in hopper 10 is discharged by feed screw 11 driven by feed screw motor 12. Scale 13 measures the combined weight of hopper 10 feed screw 11 and motor 12 to produce a measured weight signal $W_m$. It will be understood that in a conveyer weigh feeder, scale 13 would sense the weight of material being discharged upon at least a portion of the length of the conveyer. Signal $W_m$ is applied to weight signal processor 14 in computer 15 which produces an estimate, $W_r$, of the mass flow state of material based upon the measured weight $W_m$. An operator enters a desired mass flow set-point $W_{rd}$ through control panel 16. The estimated mass flow state $W_r$ is compared with the desired mass flow $W_{rd}$ by summing junction 17 to produce an error signal state $W_{re}$. The error signal state is used by motor controller 18 to calculate a motor control signal $I_M$ which is applied to motor drive 19. The estimated mass flow state $W_r$ and the actual mass flow, are thus driven to the desired set-point $W_{rd}$.

The weight sensor is, of course, subject to random and systematic instrument and phenomenon errors. The sensor produces erroneous results not only because of internal electronic noise, but also because of the physical inertia of the sensor as well as effects of external electronic noise.

In addition, the physical plant including the material hopper, feed screw and motor are also susceptible of disturbance. These plant disturbance processes include: vibrational noise due to the mechanical movement of the feeding screw or material mixer contained within the hopper; varying or non-uniform output feed due to lumpy material or non-uniform screw discharge; refilling of the hopper with material at times and at refill rates that are uncertain; unintentional aperiodic superimposed hopper disturbances such as bumping the feeder, or dropping or lifting extraneous weights such as tools; and periodic and aperiodic disturbances of the hopper due to environmental effects such as wind, neighboring machines or passing vehicles.

In general then, a weight measurement yields only crude information about a loss-in-weight feeding system's behavior and, by itself, may be unsatisfactory for assessing the system's states and ultimately controlling the mass flow.

Figure 2:
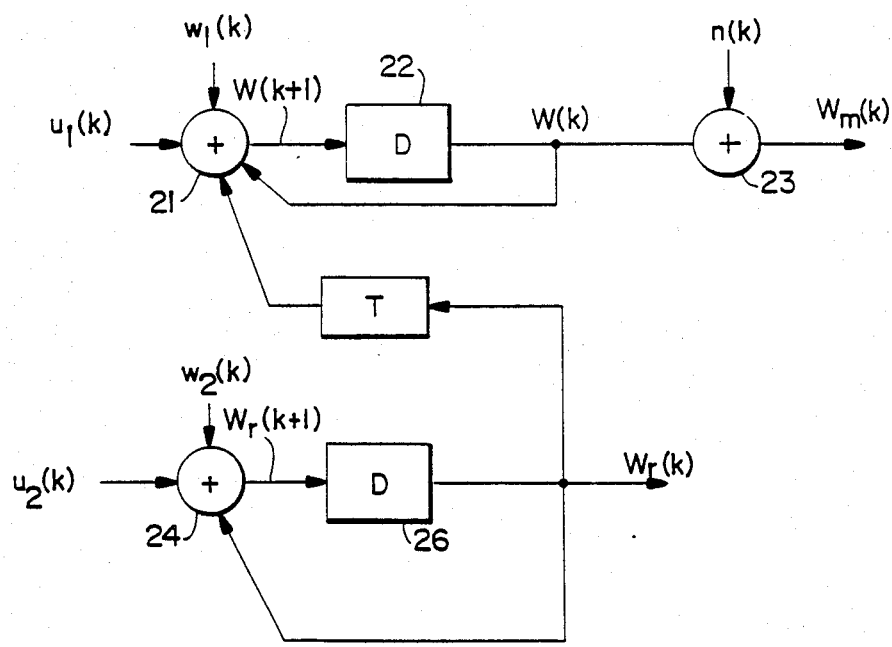
FIG. 2 is a schematic of a model of a discrete-time loss-in-weight system.

The mathematical model of a discrete-time material discharge system is shown in FIG. 2. The actual weight state of material at time $k+1$ is produced by summing junction 21 which provides the sum of the actual weight state at time k, $W(k)$, the plant noise process affecting the weight at time k, $w_1(k)$, the effect of the motor control on the weight, $u_1(k)$, and the actual mass flow state at time k, $W_r(k)$, multiplied by the sampling time T. This multiplication by T represents a time integration of mass flow state, $W_r$. Actual weight state signal $W(k+1)$ is applied to delay block 22 to produce actual weight state signal $W(k)$. The measured weight signal $W_m(k)$ is produced by summing junction 23 which adds measurement noise process $n(k)$ to actual weight state signal $W(k)$.

The actual mass flow state at time $k+1$, $W_r(k+1)$, is produced by summing junction 24 which provides the sum of the actual mass flow state at time k, $W_r(k)$, the effect of the motor control on the mass flow, $u_2(k)$, and the mass flow plant noise process $w_2(k)$. The mass flow state at time k, $W_r(k)$ is produced from the actual mass flow state $W_r(k+1)$ via delay block 26.

The block diagram of FIG. 2 is a schematic representation of the following mathematical equations:

$$W(k+1) = W(k) + TW_r(k) + u_1(k) + w_1(k)$$

$$W_r(k+1) = W_r(k) + u_2(k) + w_2(k)$$

$$W_m(k) = W(k) + n(k)$$

where:
k = 1, 2, 3, ...
$W(k)$ is the actual weight state at time k;
$W_r(k)$ is the actual mass flow state at time k;
$W_m(k)$ is the weight measurement at time k;
T is the time period between samples;
$u_1(k)$ is the effect of the motor control on the actual weight state;
$u_2(k)$ is the effect of the motor control on the actual mass flow state;
$n(k)$ is the measurement noise;
$w_1(k)$ is the plant weight noise perturbation; and
$w_2(k)$ is the plant mass flow noise perturbation.

Weight state W and mass flow state $W_r$ are known as state variables, and the mass flow state is the time derivative of the weight state (i.e., the weight is the integral of the mass flow). The only state variable sensed is the weight W which can only be sensed indirectly from the noise corrupted signal $W_m$. It is to be noted that noise processes n, $w_1$ and $w_2$ are unavoidable and are always present in the system. Controlling, via $u_1$ and $u_2$, the discharge using only measured weight signal $W_m$ in ignorance of the plant and measurement noise processes, will invariably result in an inferior system.

Figure 3:
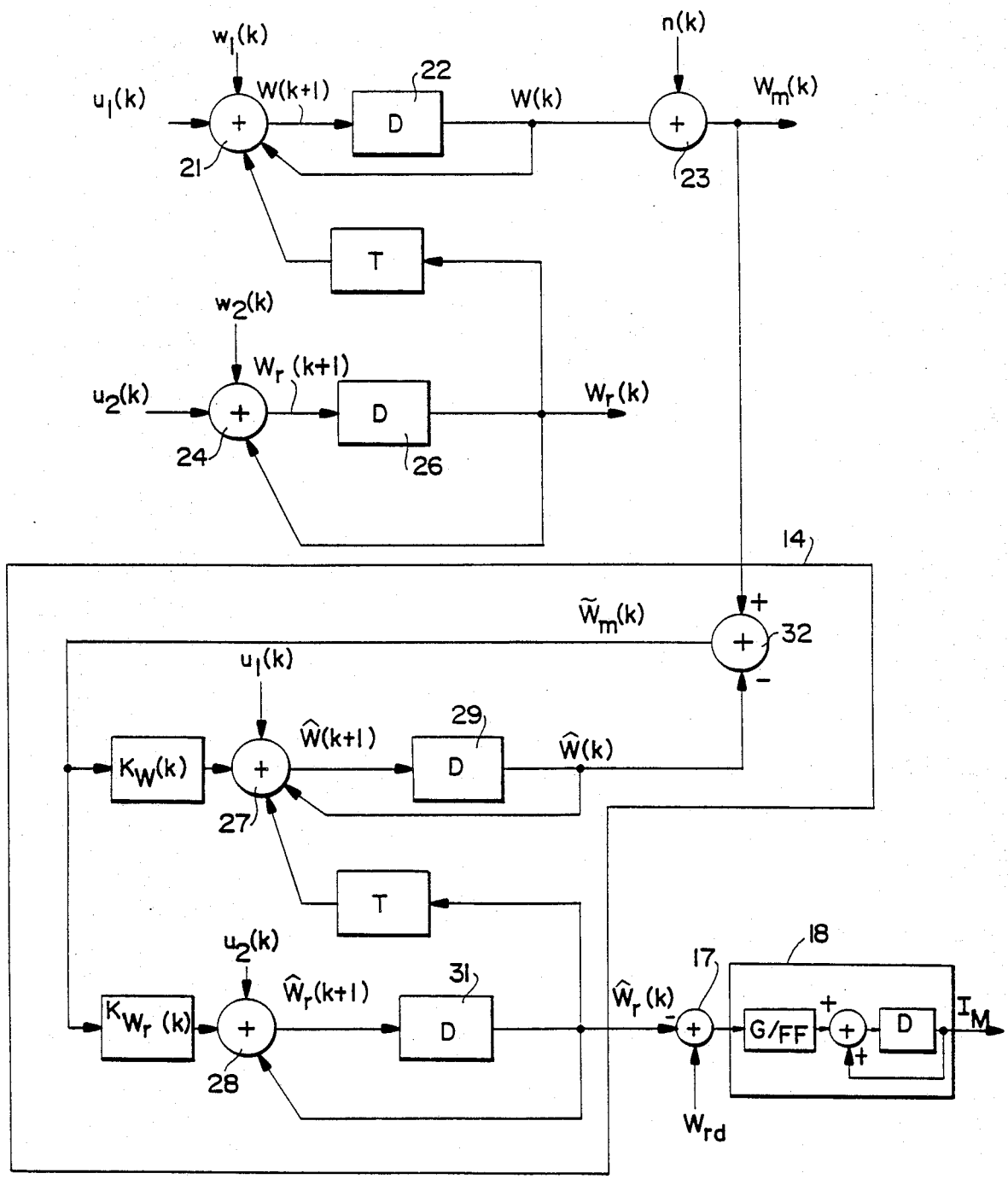
FIG. 3 is a schematic of a model of a discrete-time loss-in-weight system, a Kalman filter to estimate mass flow and a motor control signal processor according to the present invention.

FIG. 3 is a block diagram of a real discrete-time material discharge system connected to a block diagram of a discrete-time weight signal processor and motor controller according to the present invention. Elements identical to those in FIGS. 1 and 2 bear the same numeral identifier. The weight signal processor uses a Kalman filtering process to develop a filtered estimate of the actual weight state $\hat{W}(k)$ and a filtered estimate of the mass flow state $\hat{W}_r(k)$. The estimate of mass flow state $\hat{W}_r(k)$ is used, by motor controller 18, as shown schematically in FIG. 3 and in detail in FIGS. 5 and 11, to calculate motor control signal $I_M$ and motor controls $u_1(k)$ and $u_2(k)$. Motor controls $u_1(k)$ and $u_2(k)$ are the mathematical affects on actual weight state $W(k)$ and actual mass flow state $W_r(k)$, respectively, and are used in the prediction process of estimated weight state $W(k)$ and estimated mass flow state $\hat{W}_r(k)$.

In the lower portion of FIG. 3 is signal processor 14, summing junction 17 and motor controller 18 shown in FIG. 1. The signal processor is configured as a Kalman filter whose structure is identical to the mathematical model of the real system. Summing junctions 27 and 28 perform the function of summing junctions 21 and 24 in the real system. Delay blocks 29 and 31 model the functions of real delay blocks 22 and 26, respectively.

Summing junction 32 provides the difference between measured weight $W_m(k)$ and estimated weight state $\hat{W}(k)$. This difference, $\tilde{W}_m(k)$, also known as the measurement residual, is multiplied by gain $K_W(k)$ and applied to summing junction 27 in calculating the next weight state estimate $\hat{W}(k+1)$. $\tilde{W}_m(k)$ is also multiplied by gain $K_{W_r}(k)$ and applied to summing junction 28 in calculating the next mass flow state estimate $\hat{W}_r(k+1)$. Gains $K_W$ and $K_{W_r}$ are known as the Kalman gains and are variable according to the error covariance of the estimated weight state $\hat{W}$ and estimated mass flow state $\hat{W}_r$ relative to the real values of W and $W_r$, while taking into account noise processes n, $w_1$ and $w_2$. Details of the calculation of Kalman gains $K_W$ and $K_{W_r}$ are presented below referring to FIG. 4.

Since the effects of the noise processes n, $w_1$ and $w_2$ are used in the calculation of the Kalman gains, it is important not only to identify the various noise sources and their effect on the state variables W and $W_r$, but also to model their magnitudes and to include the magnitudes into the Kalman gain calculation.

Each noise process is modeled as a zero mean, white process with the following noise covariances:

$$R(k) = [\sigma^2_n]$$

$$Q(k) = \begin{bmatrix} \sigma^2_{w1} & \sigma^2_{w1,w2} \\ \sigma^2_{w1,w2} & \sigma^2_{w2} \end{bmatrix}$$

where:
$\sigma^2_n$ is the variance of the measurement noise process;
$\sigma^2_{w1}$ is the variance of the plant noise process affecting the weight;
$\sigma^2_{w2}$ is the variance of the plant noise process affecting the mass flow; and
$\sigma^2_{w1,w2}$ is the covariance of plant noise processes $w_1$ and $w_2$.

As mentioned above, plant noise processes $w_1$ and $w_2$ are the weight noise perturbation and mass flow noise perturbation, respectively. In a practical system, mass flow noise perturbation $w_2$ is a regular noise process due to, for example, lumpy or non-uniform material being fed. Weight noise perturbation $w_1$ is an irregular process due to highly unpredictable sources, such as vibrations from passing vehicles, or physical impact with the material hopper. Measurement noise process n is also a regular noise process due to random and systematic measurement instrument and discharge system phenomenon errors. For example, vibrations from the feed screw or material mixer, in addition to weight sensor inaccuracies, contribute to measurement noise process n.

Variance, $\sigma^2 n$ can be determined experimentally or emperically from an actual system. For example, the material discharge system may be operated without loss in weight and variance $\sigma^2 n$ can be calculted from a series of weight measurements $W_m(k)$. The variance, $\sigma^2 w_2$, can be calculated from machine operational specifications. For example, if the desired mass flow deviation ($\sigma_{Wd}$) is specified, $\sigma_{w2}$ can be set proportional to $\sigma_{Wd}$. In the preferred alternate embodiment, variances $\sigma^2_n$ and $\sigma^2_{w2}$ are calculated using a self-tuning procedure described in detail below with reference to FIGS. 9-14.

In contrast, plant noise process $w_1$, being unpredictable, is modeled as having variance A, where A is determined from the magnitude of the sensed measurement residual. Details of this process and calculation of A are described below with reference to FIG. 4B.

Finally, since the plant noise processes are typically not correlated, $\sigma^2_{w1,w2}$ is equal to 0.

The plant noise covariance matrix Q(k) is determined in the following manner. First, Q(k) is set equal to $Q_o$. where:

$$Q_o = \begin{bmatrix} 0 & 0 \\ 0 & \sigma^2 w_2 \end{bmatrix}$$

Next, A is calculated from the magnitude of the measurement residual and the probability of occurrence of that magnitude of residual. Then Q(k) is replaced by $Q_1$ where:

$$Q_1 = \begin{bmatrix} A & 0 \\ 0 & \sigma^2 w_2 \end{bmatrix}$$

Figure 4A:
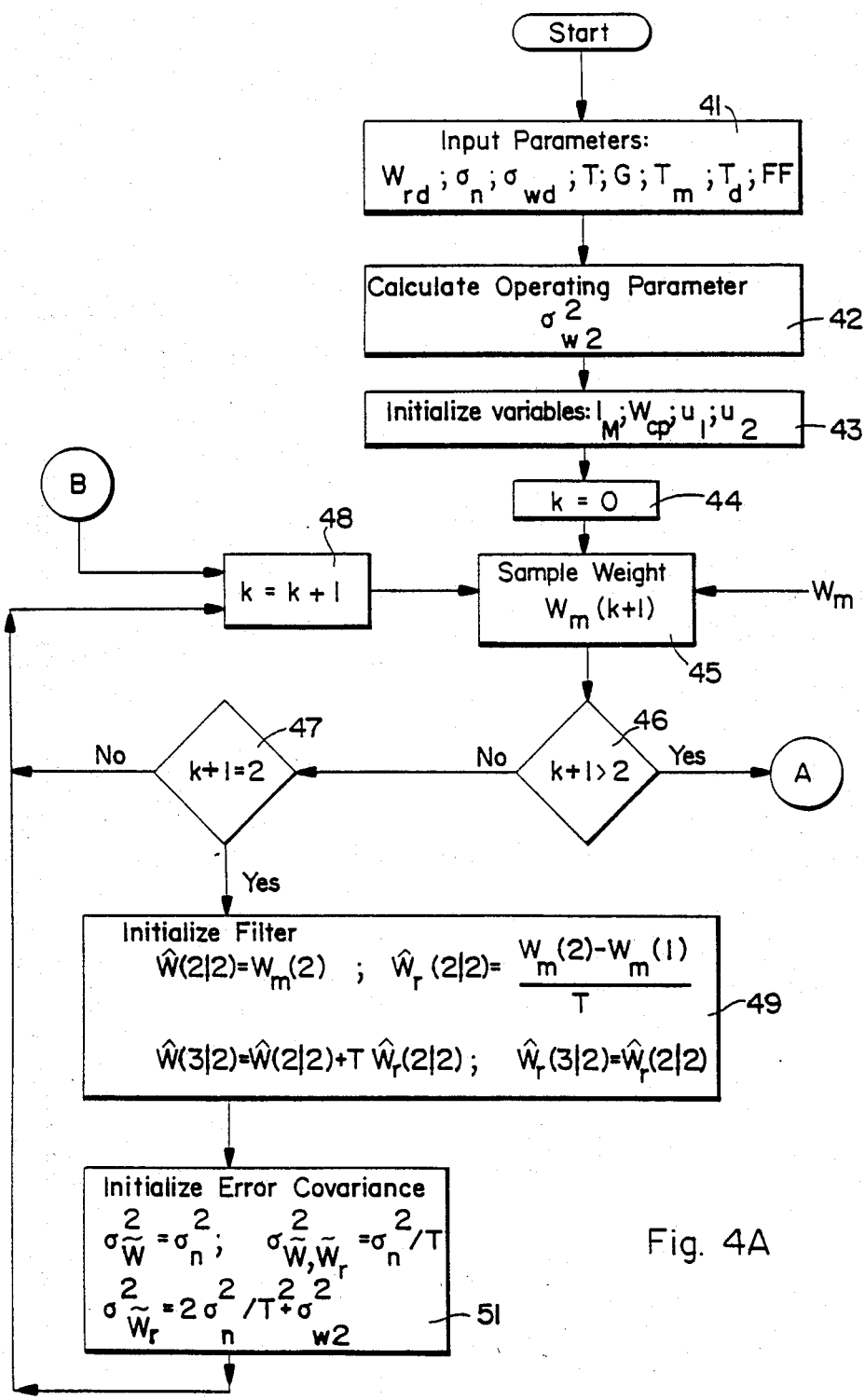
FIGS. 4A-4C are flowcharts of the computational steps performed by the weight signal processor of the present invention.
Figure 4B:
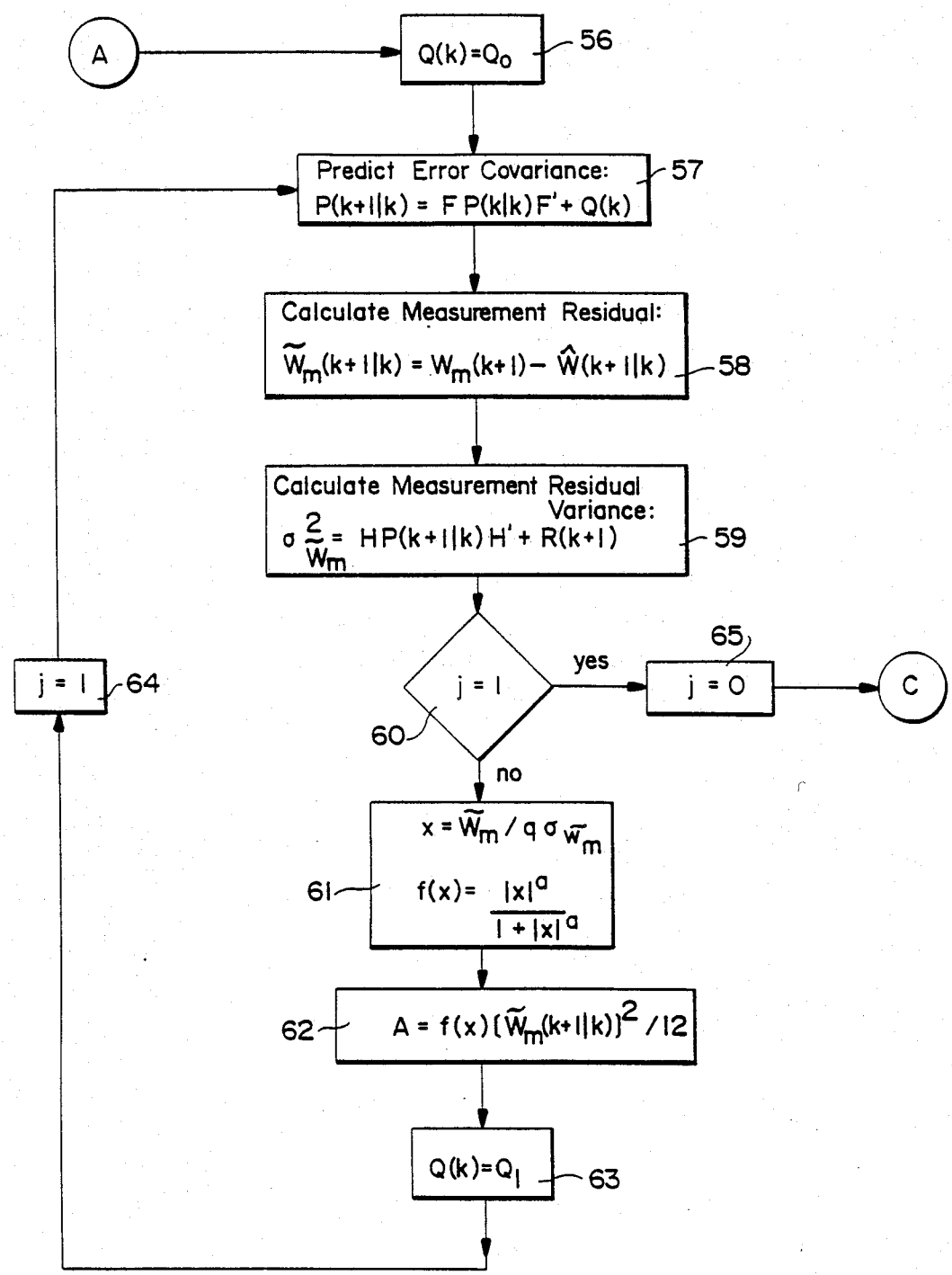
Figure 4C:
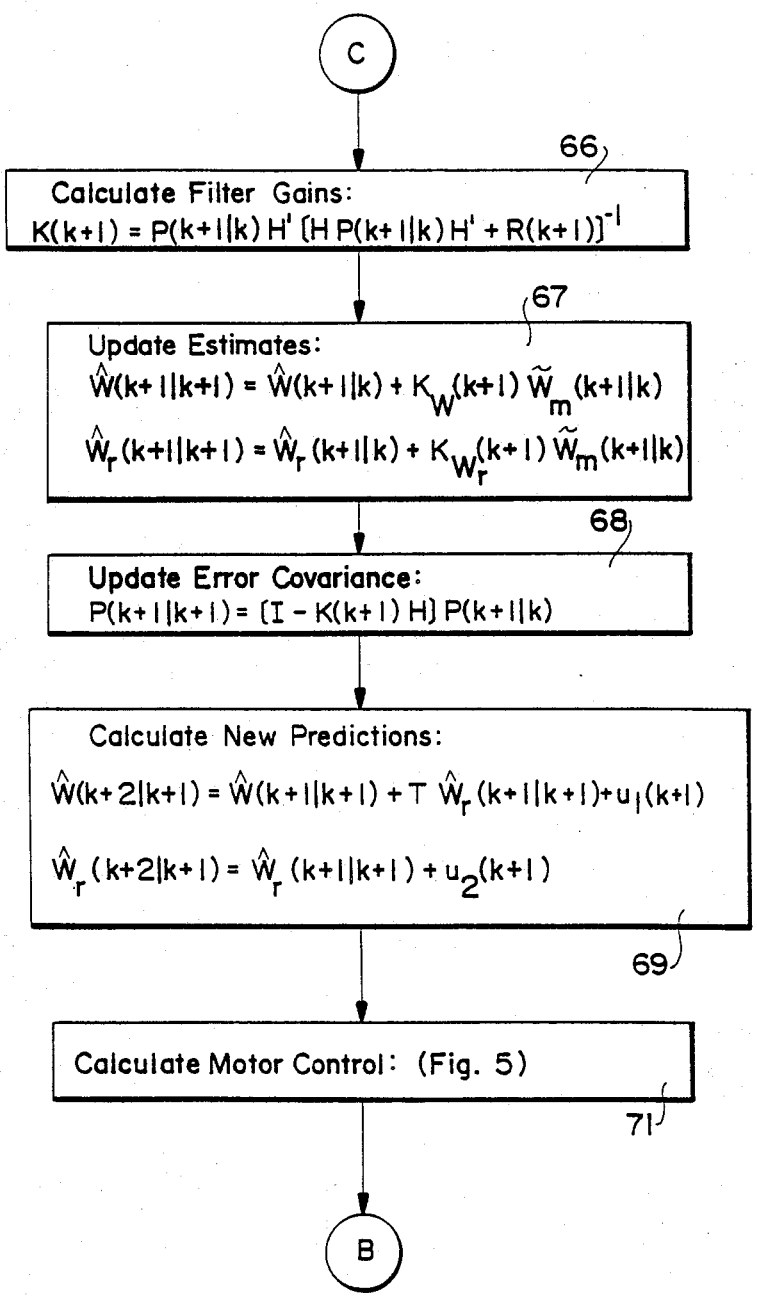

Referring to FIGS. 4A-4C, the process steps executed by signal processor 14 (FIG. 1) are shown. After the process is started, the following parameters are initialized in step 41.

$W_{rd}$—the desire mass flow set point;
$\sigma n$—the standard deviation of measurement noise n;
$\sigma w_d$—the desired standard deviation of mass flow;
T—the weight signal ($W_m$) sampling period;
G—the gain constant of the motor controller;
$\tau_m$—the time constant of the screw motor;
$T_d$—the commutation delay associated with the feed motor; and
FF—the feed factor of the feed screw motor.

In Step 42, the variance, $\sigma^2_{w2}$, is calculated from the desired standard deviation of mass flow, $\sigma_{wd}$. This is an iterative calculation based on the known steady state relationship between the desired mass flow error variance ($\sigma^2 w_r = \sigma^2 w_d$) and the parameters T, $\sigma^2 n$ and $\sigma^2 w_2$. The iterative calculation is shown in the routine spanning lines 4999-5220 of the source code listing without self-tuning submitted herewith. In the preferred alternate embodiment, self-tuning is employed to calculate both estimated noise variances $\sigma^2_n$ and $\sigma^2_{w2}$, using the self-tuning procedure described in detail below with reference to FIGS. 9-14. In step 43 the following variables are all initially set to 0:

$W_{cp}$—weight control signal;
$u_1$, $u_2$—motor controls affecting weight and mass flow, respectively.

Also in step 43, feed screw motor signal, $I_M$, is initialized at a desired level so that the motor is initially moving at a desired speed. In the alternative, signal $I_M$ may be initialized to 0 so that the motor is initially stationary.

In step 44, counter k is set to 0, and control is transferred to step 45 where the first weight sample $W_m(1)$ is taken. Control is then transferred to decision block 46 where, if k+1 is greater than 2, indicating that the filter has already been initialized, control is transferred to the process steps of FIG. 4B. Otherwise, control is transferred to decision block 47 where, if k+1 is not equal to 2, control is transferred to block 48 and counter k is incremented. Another weight sample is then taken in block 45. If decision block 47 decides that k+1 is equal to 2, control is transferred to block 49 where filter initialization is begun.

In block 49, the initial weight state estimate, W, is set to the measured weight at time k=2. In addition, the initial mass flow state estimate, $W_r$, is set to the difference between the first two weight measurements divided by sampling period T. Thus, the initial estimates for weight and mass flow states are found using the last weight signal and its simple time derivative. Also in block 49, the predicted estimate of weight state at time k=3 is set to the estimated weight state at time k=2 plus T times the estimated mass flow state at time k=2, and the predicted estimate of mass flow state at time k=3 is set to the estimated mass flow state at time k=2.

After the extimates and predictions of weight and mass flow states are initialized in block 49, control is transferred to block 51 where the four entries of the error covariance matrix P are initialized.

The error covariance matrix P takes the form:

$$P = \begin{bmatrix} \sigma^2 \hat{W} & \sigma^2 \hat{W}, \hat{W}_r \\ \sigma^2 \hat{W}, W_r & \sigma^2 \hat{W}_r \end{bmatrix}$$

where:
$\sigma^2 \hat{W}$ is the variance of the weight error;
$\sigma^2 \hat{W}_r$ is the variance of the mass flow error; and
$\sigma^2 \hat{W}, W_r$ is the covariance of the weight and mass flow errors.

After error covariance matrix P is initialized in block 51, control is transferred to block 48 where counter k is incremented and another weight sample is taken in block 45. Once the filter is initialized, k+1 will be greater than 2 and decision block 46 will transfer control to block 56 of FIG. 4B.

When self-tuning is employed, the process steps shown in the flow chart of FIG. 10, described in detail later, are employed instead of those shown in FIG. 4A.

In block 56, plant noise covariance matrix Q(k) is set to $Q_0$ and control is transferred to block 57 where error covariance matrix P is updated using the matrix equation:

$$P(K+1|k) = FP(k|k)F' + Q(k)$$

where:

P(k+1|k) is the prediction of error covariance matrix P at time k+1 given measurements up to and including time k;

P(k|k) is the error covariance matrix P at time k given measurements up to and including time k;

$$F = \begin{bmatrix} 1 & T \\ 0 & 1 \end{bmatrix};$$

F' is the transpose of F; and

Q(k) is the plant noise covariance matrix at time k.

It should be noted that the diagonal elements of the P matrix ($\sigma^2\tilde{W}$ and $\sigma^2\tilde{W}_r$) are a measure of the performance of the estimation process. Although theoretically impossible, if the variance of the weight error $\sigma^2\tilde{W}$, and the variance of the mass flow error, $\sigma^2\tilde{W}_r$, are both zero, the estimates are perfect, i.e., the same as the real states. As a practical matter, only minimization of these error variances is realizable.

Control is then transferred to block 58 where the measurement residual is calculated using the equation:

$$\tilde{W}_m(k+1|k) = W_m(k+1) - \hat{W}(k+1|k)$$

where:

$\tilde{W}_m(k+1|k)$ is the measurement residual at time k+1 given measurements up to and including time k;

$W_m(k+1)$ is the weight measurement at time k+1; and $\hat{W}(k+1|k)$ is the estimated weight state at time k+1 given measurements up to and including time k.

Control is then transferred to block 59 where the measurement residual variance is calculated using the matrix equation:

$$\sigma^2\tilde{W}_m = HP(k+1|k)H' + R(k+1)$$

where:

H = [1 0];

H' is the transpose of H;

P(k+1|k) is calculated in block 57; and

R(k+1) is the measurement noise variance at time k+1 (actually $\sigma^2 n$).

Control then passes to decision block 60 where flag j is tested to decide if, during the present cycle, variance A has already been calculated by traversing the loop shown in FIG. 4B. If variance A has not yet been calculated this cycle, control is transferred to block 61 where variable x is set to the measurement residual $\tilde{W}_m(k+1|k)$ divided by a constant q and the standard deviation of the measurement residual (the square root of the variance calculated in block 59). Constant q is preferably in the range of $3 \leq q \leq 5$, however, values outside of this range are acceptable without departing from the scope of the invention.

An adaptive distribution function f(x) is also calculated in block 61 by the equation:

$$f(x) = |x|^a/(b + |x|^a)$$

where:

$2 \leq a \leq 4$.

Values outside of this range are acceptable without departing from the scope of the invention. The exact values of q and a depend upon the particular weigh feeder used and are determined experimentally in order to minimize the various elements of the error covariance matrix P during normal operation, and to minimize the deleterious effects of aperiodic hopper disturbance (such as refill).

f(x) represents the probability that the cause of the present measurement residual is a source outside of that indicated by the previous error covariance matrix P(k+1|k) (calculated in block 57), and due to measurement noise n(k) and mass flow noise $w_2(k)$.

Control then passes to block 62 where variance A is calculated as the product of the adaptive distribution function, f(x), multiplied by the square of the measurement residual divided by 12. This results in a uniform distribution for A.

Control then passes to block 63 where matrix Q(k) is set equal to $Q_1$, and flag j is set equal to 1 in block 64 before returning control to block 57.

Then, using the new value for Q(k), the error covariance matrix is recalculated in block 57, the measurement residual is recalculated in block 58 and the measurement residual variance is recalculated in block 59. Next, since flag j is now 1, control passes from block 60 to block 65 where counter j is reset to 0. Control is then transferred to block 66 of FIG. 4C.

Referring to FIG. 4C, the filter gains K are calculated in block 66 using the matrix equation:

$$K(k+1) = P(k+1|k)H'[HP(k+1|k)H' + R(k+1)]^{-1}$$

where:

$$K(k+1) = \begin{bmatrix} K_w(k+1) \\ K_{wr}(k+1) \end{bmatrix};$$

$K_w(k+1)$ is the weight Kalman gain at time k+1;

$K_{wr}(k+1)$ is the mass flow Kalman gain at time k+1; and all other variables have been previously defined or calculated.

The predicted weight state $\hat{W}$ and predicted mass flow state $\hat{W}_r$, at time k+1 given measurements up to and including time k+1, are then calculated in block 67 using the equations:

$$\hat{W}(k+1|k+1) = \hat{W}(k+1|k) + K_w(k+1)\tilde{W}_m(k+1|k)$$

$$\hat{W}_r(k+1|k+1) = \hat{W}_r(k+1|k) + K_{wr}(k+1)\tilde{W}_m(k+1|k)$$

where all variables have been previously defined and calculated.

Control is then transferred to block 68 where error covariance matrix P is updated. The matrix I appearing in the equation in block 68 is the identity matrix. All other variables have been previously defined and calculated.

Control is then transferred to block 69 where new predictions for estimated weight state $\hat{W}$ and mass flow state $\hat{W}_r$ are calculated for time k+2 given measurements up to and including time k+1, using the following equations:

$$\hat{W}(k+2|k+1) = \hat{W}(k+1|k+1) + T\hat{W}_r(k+1|k+1) + u_1(k+1)$$

$$\hat{W}_r(k+2|k+1) = \hat{W}_r(k+1|k+1) + u_2(k+1)$$

where:

$u_1(k+1)$ is the value of the motor control applied at time $k+1$ which is predicted to affect the weight state at time $k+2$;

$u_2(k+1)$ is the value of the motor control applied at time $k+1$ which is predicted to affect the mass flow state at time $k+2$; and where all other variables have been previously defined and calculated.

Control is then transferred to block 71 where the motor control is updated. The details of the processing steps performed within block 71 are shown in FIG. 5.

Upon exiting block 71, control is returned to block 48 (FIG. 4A) where counter k is incremented and the entire loop is retraced. It should be noted that, since the time necessary to traverse the loop may vary slightly from cycle to cycle, sampling period T is changed slightly from period to period. In the preferred embodiment, T is in the range of $0.75 \leq T \leq 2.0$ seconds although time periods outside of this range also produce acceptable results. Recalculation of T each cycle is illustrated in FIG. 6F.

Figure 5:
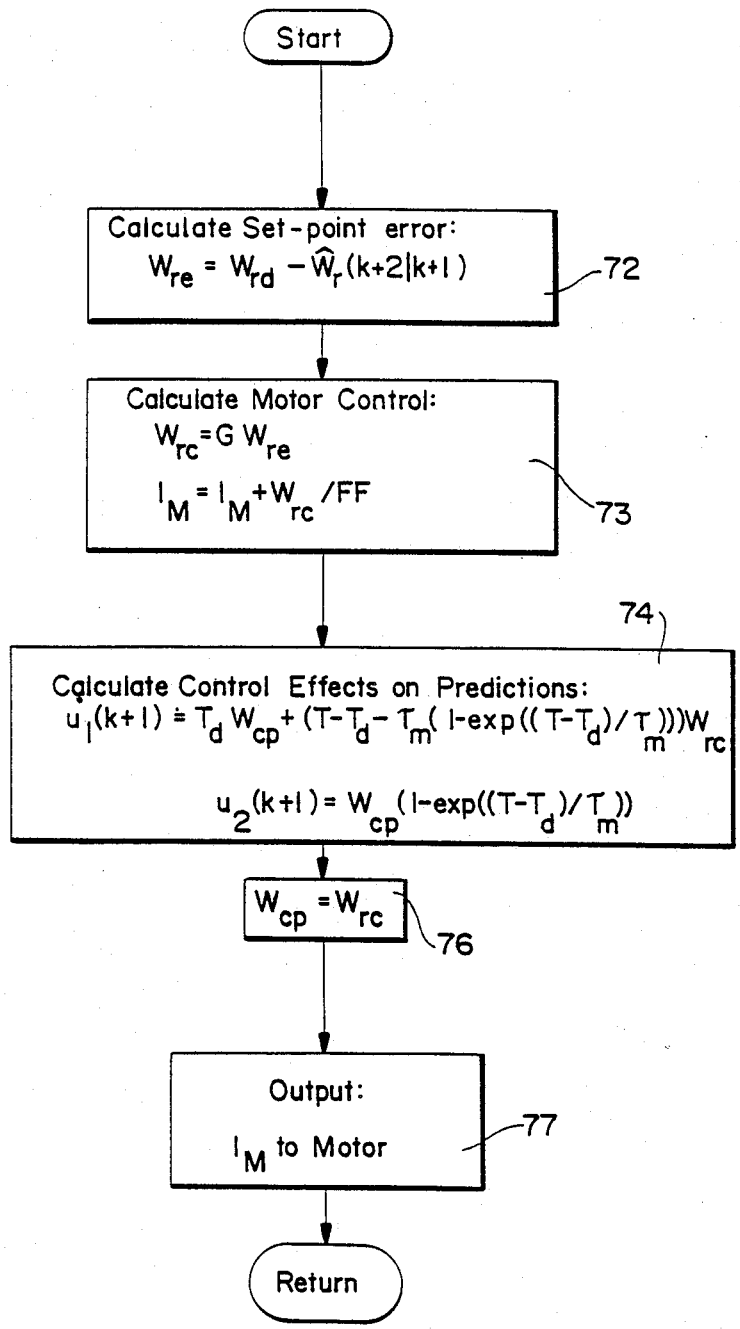
FIG. 5 is a flowchart of the computational steps performed by the motor controller of the present invention.

Referring to FIG. 5, in block 72, mass flow error signal, $W_{re}$, is calculated as the difference between desired mass flow set point, $W_{rd}$, and the mass flow state estimate, $\hat{W}_r$, previously calculated in block 69 of FIG. 4C. Control is then transferred to block 73 where weight rate control signal, $W_{rc}$, is calculated as the product of gain, G, and mass flow error, $W_{re}$. Motor signal $I_M$ is then adjusted by weight rate control signal, $W_{rc}$, divided by feed factor FF. Feed factor FF is used to convert the mass flow state variable to the motor speed signal in order to compensate for the nonlinear relationship between motor signal $I_M$ and motor speed.

Control is then transferred to block 74 where motor controls $u_1$ and $u_2$, are calculated. These calculations represent a model of the control portion of the material discharge system. This is to be distinguished from the model of the estimation or filtering shown in FIG. 3 and in the process steps of FIGS. 4A-4C.

In block 76, past weight control signal, $W_{cp}$, is set equal to the weight control signal just calculated, $W_{rc}$.

In step 77, caculated motor signal, $I_M$, is output to a motor controller to control the rate of the material discharge.

It should be emphasized that the Kalman filter process of the present invention is a recursive process which requires very little information be stored and carried over from one calculation time interval to the next. Therefore, the present invention can be readily adapted for use in existing material discharge systems by reprogramming microprocessor program memories, and by using preexisting random access memories.

An alternative preferred embodiment of motor control calculations employing self-tuning procedures is shown in the flow chart of FIG. 11, described in detail later.

FIGS. 6A-6F graphically illustrate the operation of an actual weigh feeding system under closed-loop computer control.

The system was started at cycle 0 with the following initial parameters: T=1.3; $W_{rd}$=500; FF=0.3; q=3; and a =2. The system was started and run for approximately 100 calculation cycles while feeding semolina. Both natural plant and measurement noise were present. In addition, the system hopper was subjected to the following deliberate outside perturbations:

| Approximate Cycle Time | Perturbation |
| --- | --- |
| 25 | 17 mm wrench on |
| 35 | 17 mm wrench off |
| 55 | 3 Kg weight on |
| 65 | 3 Kg weight off |
| 90 | Material refill |

The ordinate in graphs 6A-6C is in parts per million where one million parts is equal to approximately 150 Kg (the maximum measurable weight of the weight sensor used). In other words, a reading of 600,000 parts per million equals 60% of 150 Kg, or 90 Kg.

Figure 6A:
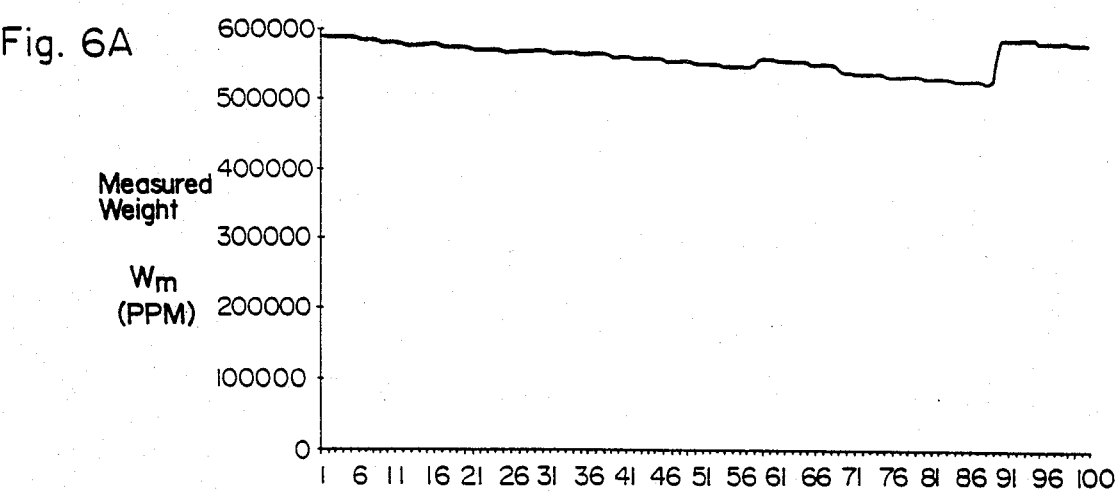
Figure 6B:
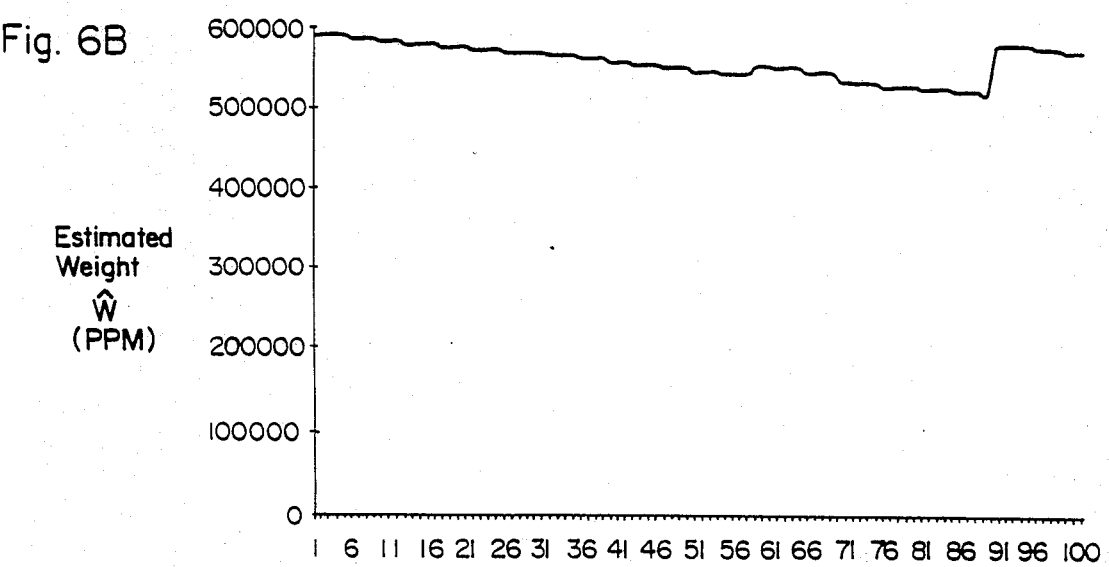
Figure 6C:
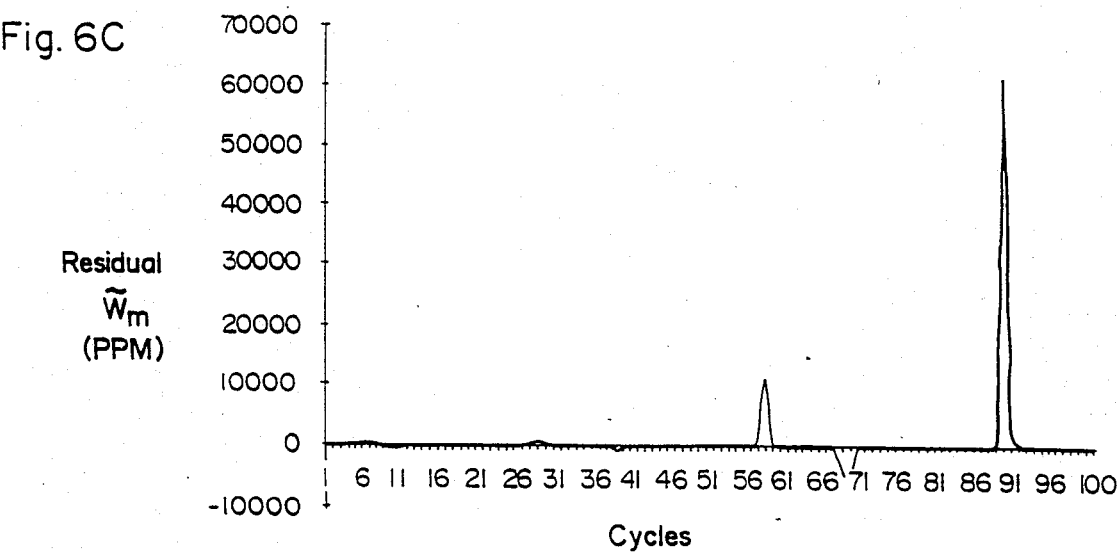
Figure 6D:
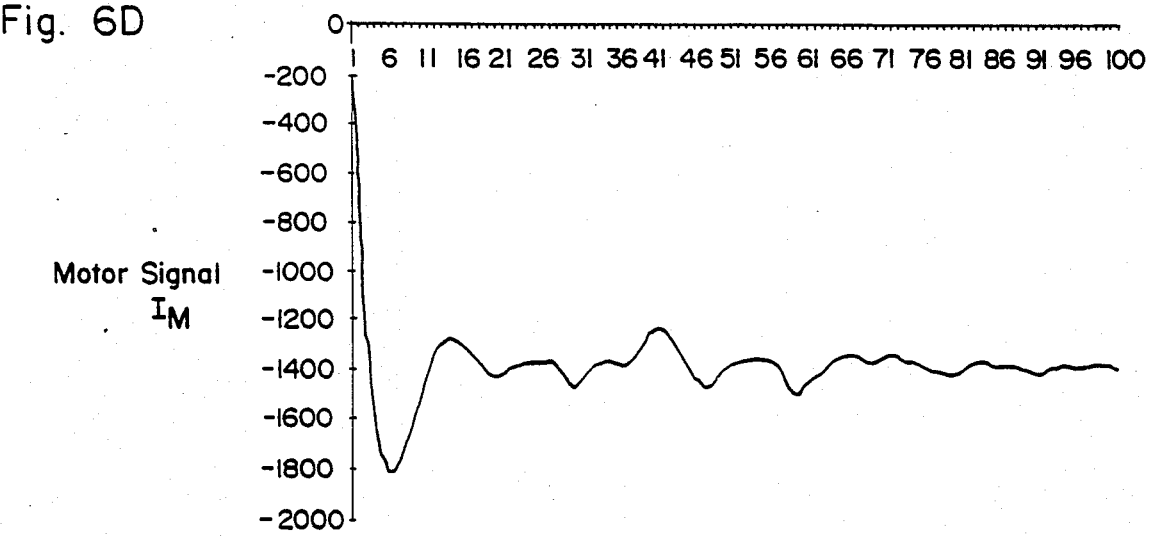

In FIG. 6D, the units of motor signal $I_M$ are directly convertable to a motor drive signal, for example, a frequency. The units of mass flow estimate in FIG. 6E are in parts per million per unit time and are directly convertable to Kg/sec.

FIG. 6F illustrates the variability of sample period T from one cycle to the next.

Figure 6E:
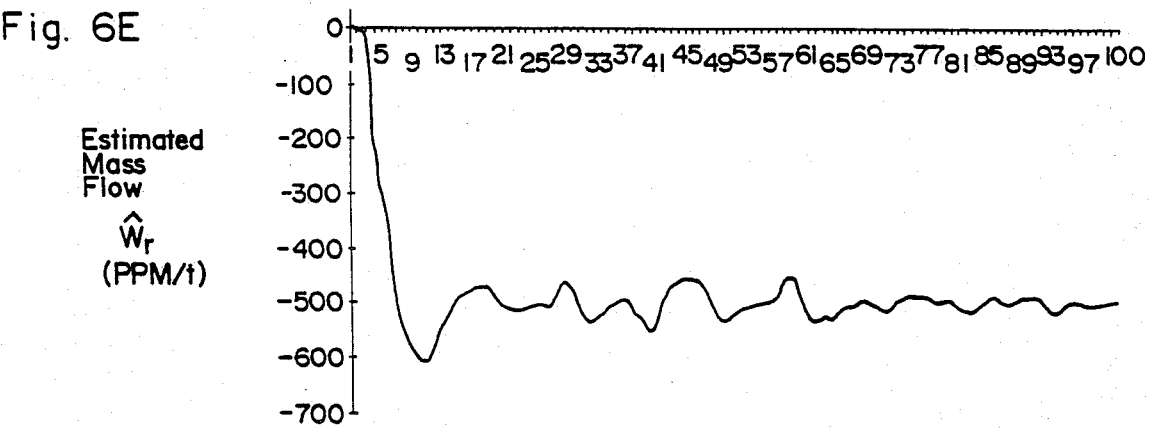
Figure 6F:
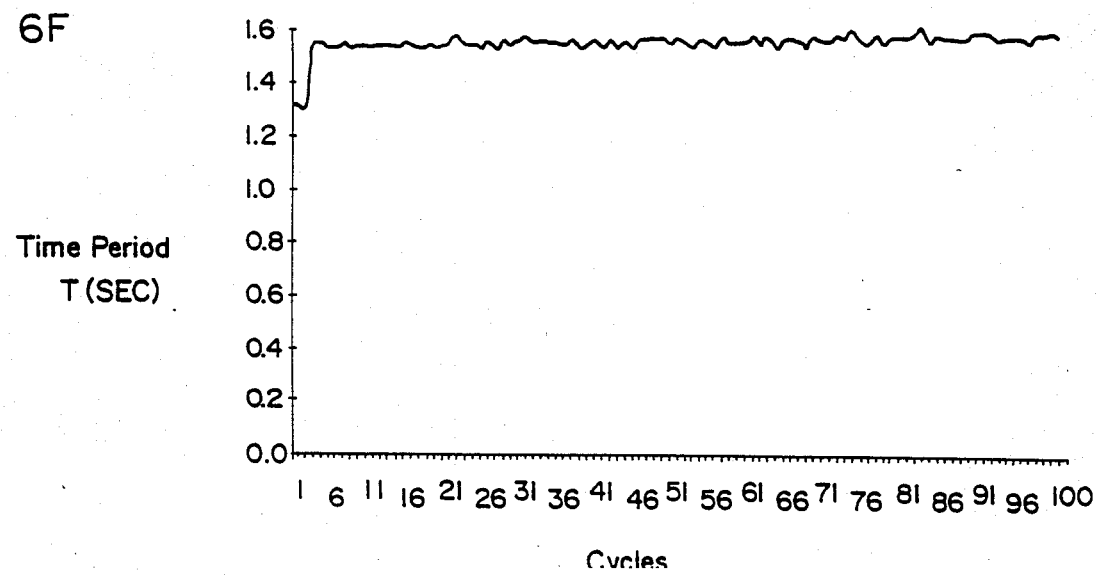

FIG. 7 is a tabular presentation of the graphs of FIGS. 6D and 6E.

Figure 8:
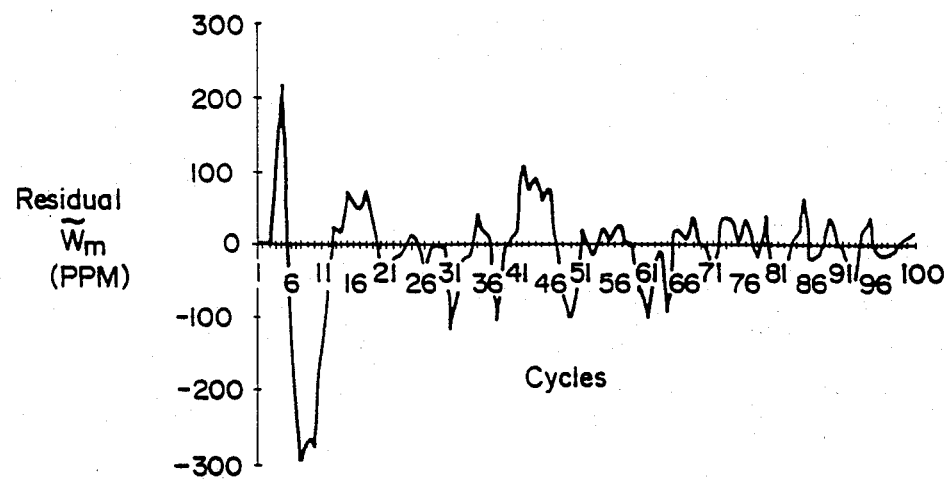
FIG. 8 is another graph of the operation of a weigh feeding system according to the present invention.

FIG. 8 is a graphical display of the same system as that operated to produce the graphs of FIGS. 6A-6F, showing operation with only the natural plant and measurement noise processes present without any outside perturbations.

The following is a commented source code listing of a computer program for computer 15 of the preferred embodiment. This program incorporates the steps shown in the flowcharts of FIGS. 4A-4C and 5.

Copyright 1986, K-Tron International, Inc.

```
2  'KALMAN FILTER FOR LOSS-IN-WEIGHT FEEDER
3  'L = CONVERSION WINDOW LENGTH
4  'I = MOTOR DRIVE COMMAND AS I= HZ.
5  'WT = WEIGHT COUNT ; WERR = WEIGHT ERROR INDICATOR
6  'TS = TIME STAMP ; DTS = MEASURED SAMPLE TIME
7  'MP = MOTOR POSITION
9  'SP = SET POINT
13 'FSC = FULL SCALE CAPACITY
14 'OPEN COMMUNICATIONS WITH THE OUTSIDE WORLD
15 'OPEN COMMUNICATIONS FILE#1 (128 BYTES) FOR ACA-1 AT 9600 BAUD,
16 'ODD PARITY, 8 DATA BITS, ONE STOP BIT, NO 'CLEAR TO SEND',
17 'NO 'DATA SET READY', PARITY CHECKING DISABLED.
18 '
```

```
20  CLS: PRINT "KALMAN FILTER ALGORITHM"
21  OPEN "COM1:9600,N,8,1,CS,DS" AS#1
23  'NOW BUILD THE DATA STATEMENTS WE'LL BE USING
24  GOSUB 2770     'ENTRANCE POINT FOR INITIALIZATION ONLY.  LOOP USES 2800
25  GOSUB 2890     'INITIALIZE ANALYZER
26  GOSUB 2750     'WRITES A RESET TO THE I/O BOARD VIA THE PORT
27  GOSUB 2640     'BUILDS A SETF$
40  CGAIN = .5: CTIMEX = 25: NSIG = 50: VDSIG = 25: T = 1.3: VDESIRE = -1500
41  F$ = "TEMP":FF=.3: T=1.35:CFLAG=0 'FF=FEED FACTOR (VELOCITY/M.SPEED COMMAND)
AND T=APPROX SAMPLE TIME
42  FSC = 60                'FULL SCALE CAPACITY IN KG
50  PRINT " "
55  INPUT " ENTER CGAIN... THE DEFAULT VALUE IS 0.5";I
60  IF I = 0 THEN 88
65  IF (I > 0) AND (I < 1!) THEN 80
70  PRINT "UNACCEPTABLE ENTRY FOR CGAIN. USE VALUE BETWEEN 0 AND 1":BEEP
75  GOTO 50
80  CGAIN = I
88  PRINT
90  PRINT " THE KALMAN FILTER IS ACTIVATED AFTER 10 SAMPLES"
95  INPUT "ENTER THE LOOP COUNT WHERE MOTOR CONTROL STARTS, DEFALUT = 25";I
97  INPUT "ENTER CONTROL TIME DELAY(TDELAY) ";TDELAY
98  INPUT "ENTER MOTOR ACTIVATION DELAY (TAU) ";TAU
100 IF I<>0 THEN CTIMEX=I
105 QFAC=3 : AFAC=2
110 PRINT " ":INPUT "INPUT WEIGHT NOISE S.D., DEFALULT = 50";I
120 IF I <> 0 THEN NSIG = I
130 PRINT " ":INPUT "INPUT VELOCITY DESIRED S.D., DEFAULT = 25";I
140 IF I <> 0 THEN VDSIG = I
160 PRINT
165 I=0!:INPUT "ENTER STARTING MOTOR SPEED (DMT WC/SEC) (DEFAULT=0)" ;ITEMP
171 IF ITEMP<>0 THEN I=ABS(ITEMP)
172 STARTIX = -INT(I)
175 I = -ABS(I/FF)  'MAKE SURE IT IS NEG.
177 PRINT :INPUT "ENTER THE OUTPUT DATA FILE NAME, DEFAULT = 'TEMP'";A$
178 IF A$ <> "" THEN F$ = A$
180 CLS
181 PRINT "********************* RUN PARAMETERS ************************"
182 PRINT
185 PRINT " CGAIN"," NSIG"," VDSIG"," CTIME"," STARTI       F$"
190 PRINT CGAIN,NSIG,VDSIG,CTIMEX,STARTIX
191 LOCATE 4,69
192 PRINT F$
195 '
200 LOCATE 7,1
210 PRINT "********************* SYSTEM STATUS ************************"
220 PRINT:PRINT " COUNT","SETPOINT","T.STAMP","DMT W.CNTS","M.SPEED"
230 LOCATE 13,1
240 PRINT "********************* FILTER CHARACTERISTICS ****************"
250 PRINT:PRINT " W.C.PRED","FLOWRATE","GAIN 1       GAIN 2      DEL T"
251 LOCATE 15,68:PRINT "PERTURBATION"
260 LOCATE 19,1
270 PRINT "** OPTIONS **   ENTER 'S' TO CHANGE SETPT., ENTER 'H' TO HALT"
329 GOSUB 5020
330 OPEN "C:"+F$ AS #2 LEN=59
332 FIELD #2, 7 AS FT$, 7 AS FX$, 9 AS FXH$, 7 AS FV$, 5 AS FK1$, 5 AS FK2$,5 AS
 FI$,7 AS FMS$,7 AS FZRES$
340 GOSUB 2520     'SENDS A WINDOW LENGTH COMMAND
350 GOSUB 2640
360 GOSUB 2560 'SEND "START READ WEIGHT" COMMAND
458 '---------------BEGINNING OF LOOP-----------------------
460 FOR LUPX=1 TO 1070
540 A$=INKEY$:IF A$="" THEN 940
560 IF (A$="S") OR (A$ = "s") THEN 700
565 IF (A$="H") OR (A$ = "h") THEN 988
570 GOTO 940
700 SCONTX=1:TDADD=TIMER:LOCATE 23,1
710 INPUT"ENTER NEW SETPOINT. THE UNITS ARE (DMT WEIGHT COUNTS)/SEC";SP
715 VDESIRE=-ABS(SP) 'I=VELOCITY OR FLOW RATE
717 TDADD=TIMER-TDADD
940 T0=TIMER
950 PRINT #1, RED$   'SEND A "READ AND START WEIGHT" COMMAND
953 GOSUB 2220              'DO MATH
955 GOSUB 2320
```

```
957 GOSUB 3000
958 Z=WT:IF LUP%=CTIME% THEN CFLAG=1
960 IF LUP%=8 THEN ZPAST=WT
965 IF LUP%=9 THEN GOSUB 6340 'INITIAL FILTER (N=0)
968 IF LUP%>9 THEN GOSUB 6010 'KALMAN FILTER
975 IF I = SAVEDI THEN 982       'I IS MOTOR DRIVE COMMAND FREQUENCY
977 SAVEDI=I:GOSUB 2640   'REBUILD A NEW MOTOR SPEED COMMAND AND SEND IT
980 'DELAY 1/2 SECOND INCLUDING PROGRAM EXECUTION TIME
982 TO=.022*L+.043 + TO
983 LSET FT$=STR$(TS):LSET FX$=STR$(WT):LSET FXH$=STR$(XHAT):LSET FV$=STR$(VHAT)
:LSET FK1$=STR$(K1):LSET FK2$=STR$(INT(K2*1000!)/1000):LSET FI$=STR$(INT(I)):LSE
T FM6$=STR$(INT(ZCST*1000)/1000):LSET FZRES$=STR$(ZRES)
984 PUT #2,LUP%+1
985 IF TIMER<TO THEN 985
986 NEXT
988 LSET FT$=STR$(LUP%-1)
990 PUT #2,1:CLOSE #2
995 I=0:GOSUB 2640:STOP
1000 '-----------------END OF LOOP-----------------------------------
2210 ' DELAY FOR ABOUT 0.1 SEC
2220 TX=TIMER + .12
2230 IF TIMER <TX THEN 2230
2240 RX$=""
2250 WHILE NOT EOF(1)
2260 I$=INPUT$(LOC(1),#1)
2270 WEND
2280 RX$=I$
2300 RETURN
2310 '*********************************************************
2320 W$=MID$(RX$,32,2)+MID$(RX$,37,2)+MID$(RX$,42,2)
2350 WT=VAL("&H"+MID$(W$,6,1))+VAL("&H"+MID$(W$,5,1))*16+VAL("&H"+MID$(W$,4,1))*
256+VAL("&H"+MID$(W$,3,1))*4096!+VAL("&H"+MID$(W$,2,1))*65536!
2351 WT=VAL("&H"+MID$(W$,1,1))*65536!*16! + WT
2358 WT=WT-TARE
2360 WERR=VAL("&H"+MID$(W$,1,1))AND 8
2370 IF WERR THEN 2372 ELSE 2400
2372 LOCATE 21,1:PRINT "WEIGHT ERROR # ";LUP%
2400 T$=MID$(RX$,47,2)+MID$(RX$,52,2)+MID$(RX$,57,2)
2420 TS=(VAL("&H"+MID$(T$,6,1))+VAL("&H"+MID$(T$,5,1))*16+VAL("&H"+MID$(T$,4,1))
*256+VAL("&H"+MID$(T$,3,1))*4096+VAL("&H"+MID$(T$,2,1))*65536!+VAL("&H"+MID$(T$,
1,1))*1048576!)*1.953125E-05
2431 TD=TS-SAVEDTS : SAVEDTS=TS
2432 IF TD<0 THEN TD=TD+327.68
2450 M$=MID$(RX$,62,2)+MID$(RX$,67,2)
2460 OLDMP = MP
2470 MP=VAL("&H"+MID$(M$,4,1))+VAL("&H"+MID$(M$,3,1))*16+VAL("&H"+MID$(M$,2,1))*
256+VAL("&H"+MID$(M$,1,1))*4096
2472 DELMP = MP-OLDMP
2474 IF (DELMP <= 0) OR (TD <= 0) THEN 2480
2476 MSPEED = DELMP/TD
2480 RETURN
2520 '*********************************************************
2530 PRINT #1,LENG$
2540 GOSUB 2220
2550 RETURN
2560 PRINT #1,STT$
2570 GOSUB 2220
2580 RETURN
2600 PRINT #1,RED$
2610 GOSUB 2220
2620 RETURN
2625 '*********************************************************
2630 'BUILD A NEW MOTOR SPEED COMMAND AND SEND IT TO THE PORT
2640 ITEMP%=-INT(I)
2642 IF ITEMP%<0 THEN ITEMP%=0
2650 MJR$=HEX$(((ITEMP%\128)AND 127)OR 128)
2680 MNR$=HEX$((ITEMP% AND 127)OR 128)
2690 CHA$=HEX$(((ITEMP%\16384)AND 3)OR 12)
2700 SETF$="'83"+"0"+CHA$+MJR$+MNR$+CHR$(3)+CHR$(16)
2710 PRINT #1,SETF$
2715 GOSUB 2220
2720 RETURN
2730 '*********************************************************
2740 'WRITE A RESET COMMAND TO THE PORT
```

```
2750 PRINT #1,REST$
2755 GOSUB 2220
2760 RETURN
2762 '*********************************************
2765 'ENTRANCE FOR INITIALIZATION ONLY!!
2770 L=48:SAVEDL=L:DELAY=.1
2775 TDADD=0:SCONT%=0:SCONT2%=0
2780 TARE=1000000!
2790 I=0!:SAVEDI=I
2800 ANASET$=CHR$(9)+CHR$(13)+CHR$(18)+"1"
2801 LDL$=HEX$(L)
2830 RED$="'8B"+"00"+CHR$(3)+CHR$(16)
2840 REST$="'87"+"00"+CHR$(3)+CHR$(16)
2850 LENG$="'86"+"01"+LDL$+CHR$(3)+CHR$(16)
2860 STT$="'86"+"00"+CHR$(3)+CHR$(16)
2870 RETURN
2880 '*********************************************
2890 PRINT #1,ANASET$
2900 RETURN
3000 IF (CFLAG) THEN CURSTP=VDESIRE ELSE CURSTP=STARTI%
3010 LOCATE 10,1
3020 PRINT LUP%,CURSTP,TS,WT,MSPEED
3030 RETURN
3995 '************* PRINT DATA IN A FILE *************************
4000 INPUT"WHAT FILE NAME";F$
4005 OPEN "C:"+F$ AS #2 LEN=59
4010 FIELD #2, 7 AS FT$, 7 AS FX$, 9 AS FXH$, 7 AS FV$, 5 AS FK1$, 5 AS FK2$,5 A
S FI$,7 AS FMS$,7 AS FZRES$
4020 GET #2,1
4030 F1=VAL(FT$)
4035 LPRINT "FILE NAME IS ";F$,TIME$,DATE$
4037 LPRINT:LPRINT"  #    TIME    X_MEAS    X_HAT    V_HAT    K1    K2    M.SP
D   M.POS   ZRES"
4040 FOR I=2 TO F1
4050 GET #2,I
4060 LPRINT (I-1);"   ";FT$;"   ";FX$;"   ";FXH$;"   ";FV$;"   ";FK1$;"   ";FK2$;"   ";FI$;
"   ";FMS$;"   ";FZRES$
4070 NEXT I
4080 CLOSE #2:STOP
4999 '******* COMPUTE DESIRED VELOCITY STANDARD DEVIATION **********
5020 NSIG2=NSIG*NSIG
5040 VDSIG2=VDSIG*VDSIG
5050 AA=VDSIG2*T*T/NSIG2
5070 A=.5:AX=.5
5080 FOR K%=1 TO 30
5090   FX=A^3/((1!-A)*(2!-A))
5100   A=A-AX*(1!-AA/FX)/(3!/A+1!/(1!-A)+1!/(2!-A))
5110   IF A>1! THEN A=.9
5120   IF A<0! THEN A=.1
5130   B=A*A/(2!-A)
5150 NEXT
5160 VSIG2=NSIG2*B*B/(T*T*(1!-A))
5170 VSIG=SQR(VSIG2)
5220 RETURN
5900 QFAC=3
5910 AFAC=2
6000 '***************** KALMAN FILTER *************************
6010 IF SCONT2%=1 THEN TD=TD-TDADD:SCONT2%=0
6020 IF SCONT%=1 THEN TD=TD+TDADD:SCONT%=0:SCONT2%=1
6030  JF%=0
6040 PP11=P11+(2!*TD*P12)+(TD*TD*P22):PP12=P12+TD*P22:PP22=P22+VSIG2
6050 ZRES=Z-XHATPRED
6060 PPZ=PP11+NSIG2
6070 REM K1=PP11/(PP11+NSIG2):K2=PP12/(PP11+NSIG2)
6080 REM P11=(1!-K1)*PP11:P12=(1!-K1)*PP12:P22=PP22-(K2*PP12)
6090 ZCONST=0
6100 IF JF%=1 THEN 6180
6110 LOCATE 16,69:PRINT "## ";LUP%;" ##":MP=-ABS(MP)
6120 ZFAC=ABS(ZRES/(QFAC*PPZ^.5))
6130 ZCONST=ZFAC^AFAC/(1+ZFAC^AFAC)
6140 ZCST=ZCONST
6150 Q11=ZCONST*ZRES*ZRES/12!
6160 PP11=PP11+Q11:JF%=1:GOTO 6060
6170 ZRES=Z-XHATPRED
```

```
6180 JFX=0
6190 K1=PP11/(PP11+NSIG2):K2=PP12/(PP11+NSIG2)
6200 XHAT=XHATPRED+K1*ZRES
6210 VHAT=VHATPRED+K2*ZRES
6220 P11=(1!-K1)*PP11:P12=(1!-K1)*PP12:P22=PP22-(K2*PP12)
6230 TD1=TD-TDELAY:BB= 1!-EXP(-TD1/TAU)
6240 XHATPRED=XHAT+TD*VHAT+TDELAY*VCPAST+(TD1-TAU*BB)*VCTEMP:VHATPRED=VHAT+VCTEM
P*BB
6250 VCERROR=VDESIRE-VHATPRED:VCPAST=VCTEMP:ZPAST=Z
6260 VCTEMP=CGAIN*VCERROR*CFLAG
6270 I=I+VCTEMP/FF
6280 IF I>0! THEN I=0!:VCTEMP=0!
6290 LOCATE 16,1:PRINT USING "######.###   ";XHAT,VHAT,K1,K2,TD,ZRES
6300 LOCATE 17,1:PRINT USING "######.###  "; ZCST
6310 ZPAST=Z
6320 RETURN
6330 'INITIAL FILTERING
6340 ZTHFX=0:P11=NSIG2:P22=(2!*NSIG2/(TD*TD))+VSIG2:P12=NSIG2/TD
6350 XHAT=Z:VHAT=(Z-ZPAST)/TD:ZPAST=Z:XHATPRED=XHAT+TD*VHAT:VHATPRED=VHAT
6360 VCERROR=VDESIRE-VHAT
6370 LOCATE 16,1
6380 PRINT USING "######.###   ";XHAT,VHAT,K1,K2,TD
6390 RETURN
```

Figure 9:
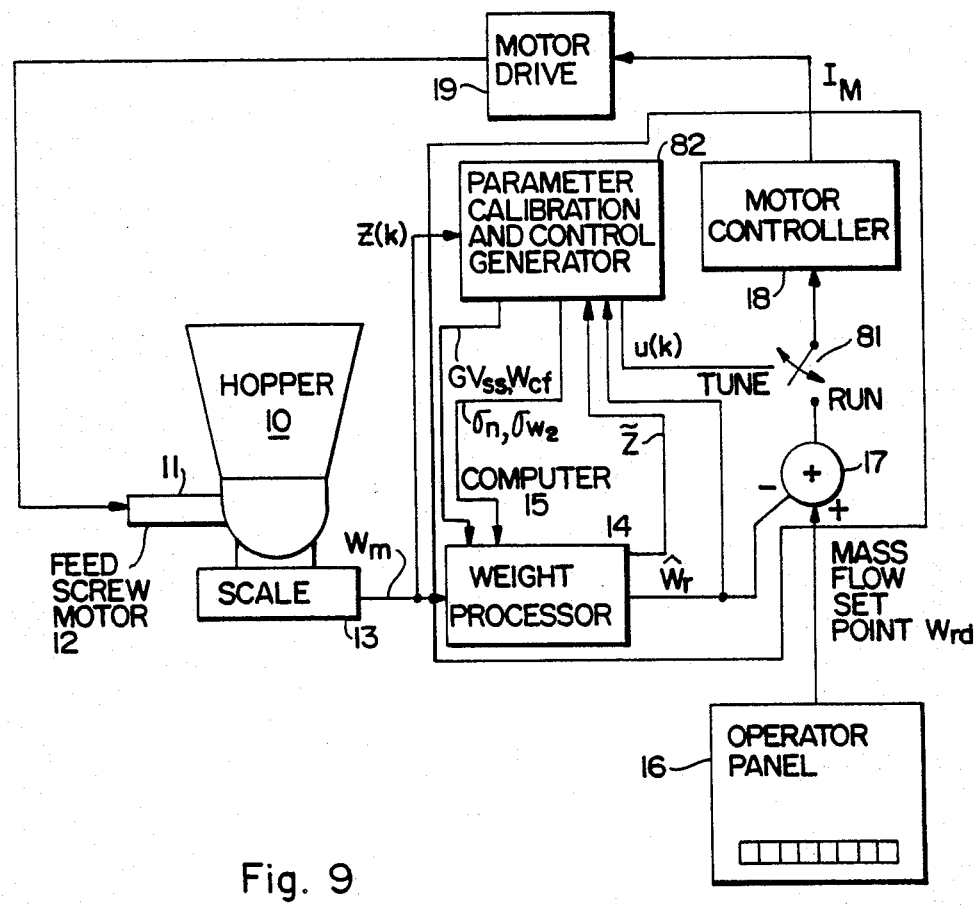
FIG. 9 is a loss-in-weight feeding system including self-tuning and embodying the present invention.

In order to facilitate the calculation of the various operational parameters, self-tuning is used to control the feeding process to generate data from which these various operational parameters can be calculated. FIG. 9 is similar to FIG. 1, and illustrates a conceptual block diagram of the general self-tuning process used to generate data from which the stochastic control and noise parameters are calculated. Functional blocks identical to those of FIG. 1 bear identical numeral designators and will not be described again.

In the general self-tuning process of the present invention, when a weigh feeding machine is first started, or when a dramatic change in operating conditions is presented (for example, changing the type of material being fed), the feeding machine is set to a calibration or tune mode shown schematically by switch 81. In the calibration mode, system calibration processer and control generator 82 causes a series of control signals u(k) to be applied to the weigh feeder, and the weigh feeder reacts to the control sequence u(k). Weight sensor 13 generates a corresponding measurement sequence z(k). the input/output signals (u(k) and z(k)) are then used by the system calibration processor and control generator 82 to estimate the noise and control parameters, for example. Then, the estimated parameters are sent to the Kalman filter, the calibration mode is exited and closed-loop control begins.

The calibration process is performed when the system is started, or whenever recalibration is desired by the system operator. FIG. 10 is similar to FIG. 4A and includes self-tuning procedures. Functional blocks in FIG. 10 which are identical to those of FIG. 4A bear identical numeral designators.

Figure 10:
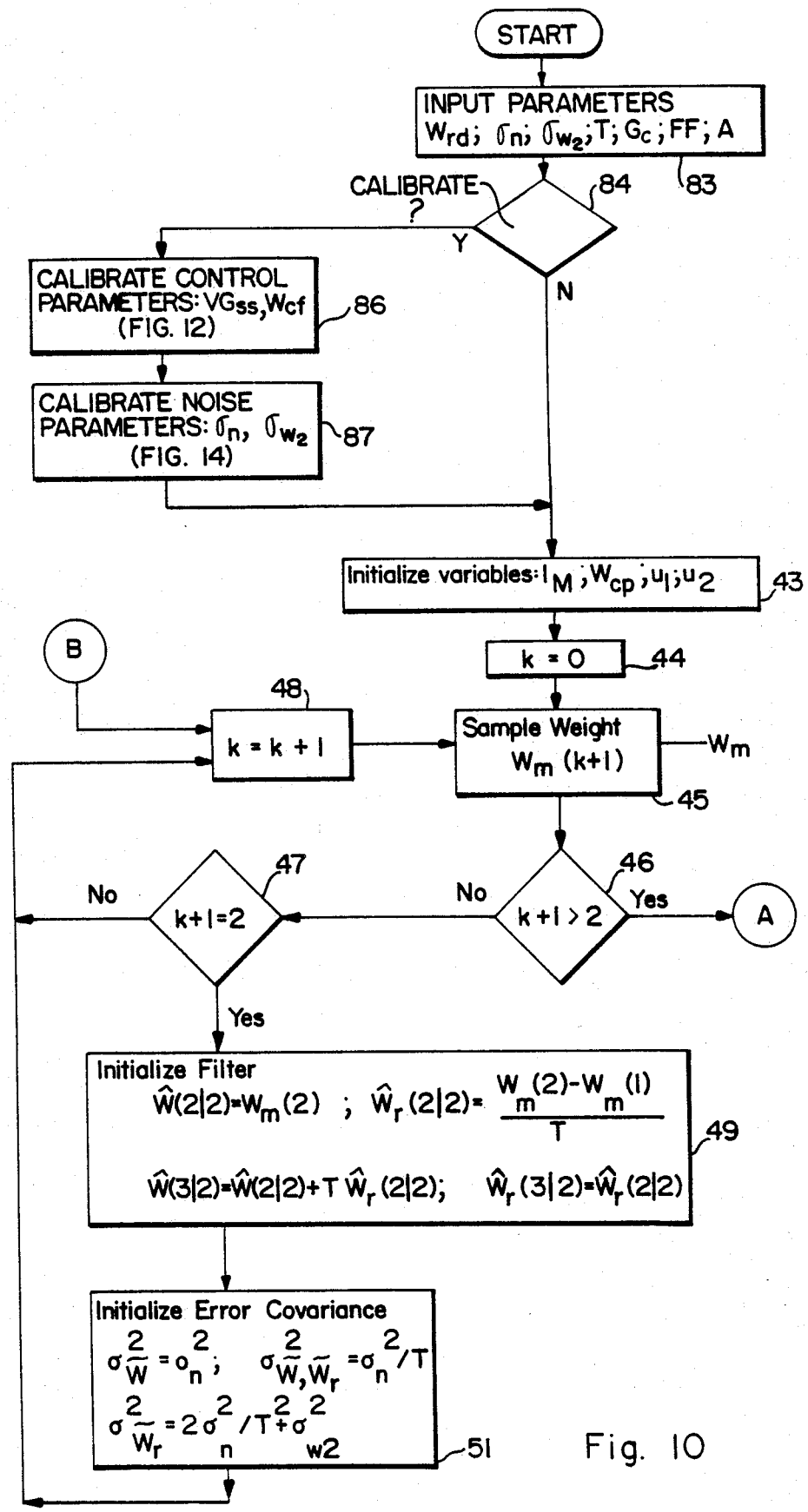
FIG. 10 is a flowchart of computational steps performed by the weight signal processor of the present invention employing self-tunning.

Refering to FIG. 10, after the system is started, the following parameters are initialized in step 83:

$W_{rd}$—the desire mass flow set point;
$\sigma_n$—the standard deviation of measurement noise n;
$\sigma_{w2}$—the standard deviation of mass flow noise;
T—the weight signal ($W_m$) sampling period;
$G_c$—the gain constant of the motor controller;
FF—the feed factor of the feed screw motor; and
A—the magnitude of the square wave used to calibrate control parameters (discussed in detail below with reference to FIG. 12).

The standard deviations for measurement noise $\sigma_n$ and mass flow noise $\sigma_{w2}$ are either carried over from previous machine operation (for example, parameters calculated during a previous factory shift, or the like), or are entered and/or calculated as described above with reference to FIG. 4A.

Control then passes to decision block 84 where it is decided, under operator control, whether the controller should be calibrated. If not, for example, if the various parameters had been calibrated during an earlier operating period of the weigh feeding machine, control is transferred directly to block 43, and control proceeds as described above with reference to FIGS. 4A–C. If calibration is desired, for example, if the type of material being fed is changed, control is transferred to blocks 86 and 87 where the control parameters, $GV_{ss}$ and $W_{cf}$, and noise parameters, $\sigma_n$ and $\sigma_{w2}$, are respectively calibrated using the procedures depicted in FIGS. 12 and 14, described in detail below.

After parameter calibration in blocks 86 and 87, control passes to block 43, and proceeds as described above with reference to FIGS. 4A–C.

Figure 11:
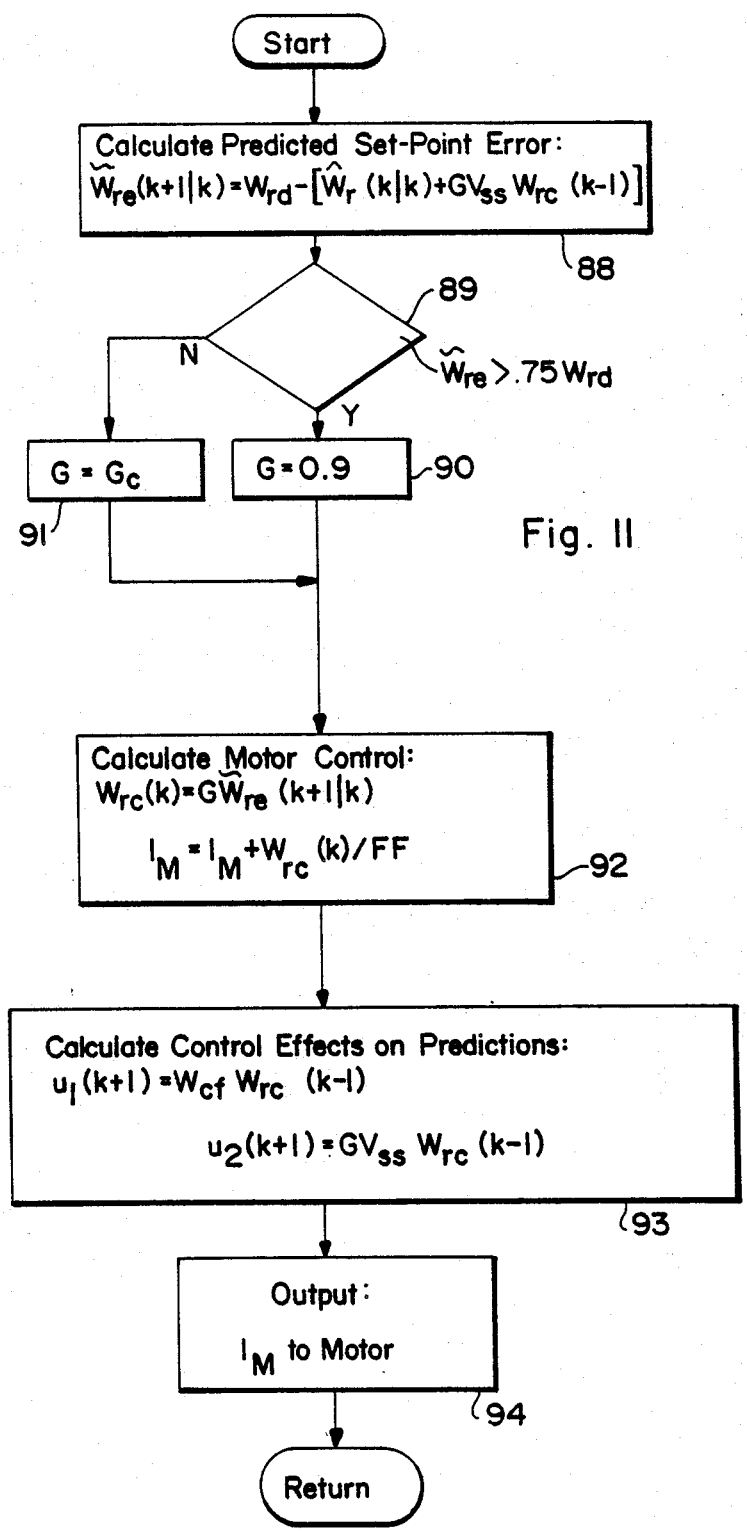
FIG. 11 is a flowchart of the computational steps performed by the motor controller of the present invention employing self-tuning.

In this alternate preferred embodiment, when motor control is calculated in block 71 of FIG. 4C, the adaptive motor control calculations shown in FIG. 11 are performed.

Referring to FIG. 11, in block 88, the predicted set-point error, $\tilde{W}_{rc}(k+1|k)$, is calculated using the equation:

$$\tilde{W}_{rc}(k+1|k) = W_{rd} - [\hat{W}_r(k|k) + GV_{ss}W_{rc}(k-1)]$$

where:
$\tilde{W}_{rc}(k+1|k)$ is the predicted set-point error for time $k+1$ given measurements up to and including time k;
$W_{rd}$ is the desired set-point;
$\hat{W}_r(k|k)$ is the estimated mass flow state at time k given measurements up to and including time k;
$GV_{ss}$ is the small signal gain; and
$W_{rc}(k-1)$ is the weight rate control signal calculated the previous cycle.

Small signal gain $GV_{ss}$ is calibrated during the control calibration process described below with refernce to FIG. 12.

Control then passes to decision block 89 where the predicted set-point error, $\tilde{W}_{rc}(k+1|k)$, calculated in block 88 is compared with the desired set-point, $W_{rd}$. If the predicted set-point error, $\tilde{W}_{re}(k+1|k)$, is greater than 75% of the desired set-point, $W_{rd}$, control is transferred to block 90 where the control gain G is set equal to 0.9. If the predicted set-point error, $W_{re}(k+1|k)$, is less then 75% of the desired set-point, $\tilde{W}_{rd}$, control is transferred to block 91 where control gain G is set equal to $G_c$ (set in block 83 of FIG. 10). $G_c$ is less than 0.9, and is preferably 0.1. Of course, other values of $G_c$ could be used without departing from the scope of the invention.

Thus, a form of integral control is employed with the control gain G varying as a function of the magnitude of the predicted set-point error, $\tilde{W}_{re}(k+1|k)$, relative to the desired set-point, $W_{rd}$. Although only two values for gain G are used in the disclosed embodiment, it is understood that this is by way of example and not limitation. G may take many different values, and indeed may even be a continuous function of the set-point error.

Control then passes to block 92 where weight rate control signal $W_{rc}(k)$ is calculated from control gain G and predicted set-point error, $\tilde{W}_{re}(k+1)$. Motor control current value $I_M$ is also calculated in block 92.

Then, in block 93, the control effects $u_1(k+1)$ and $u_2(k+1)$ are calculated from the weight rate control signal, $W_{rc}(k-1)$, calculated the previous cycle using weight compensation factor $W_{cf}$ and small signal gain $GV_{ss}$ (both calibrated by the control parameter calibration procedure of FIG. 12, described below). The weight rate control signal from the previous cycle, $W_{rc}(k-1)$, is used to calculate control effects, $u_1(k+1)$ and $u_2(k+1)$, for the next cycle in order to accomodate time delays within the weigh feeding system which total approximately two sampling periods (2T). In other words, control applied at sampling time k will not affect the detectable weight until approximately sampling time k+2.

Control then passes to block 94 where motor control current $I_M$ is output to the motor. Control is then returned to block 71 of FIG. 4C to continue cyclic processing.

Turning now to control parameter calibration performed within block 86, it has been observed that a step response of the weigh feeding system can be used to calibrate the control model of the stochastic controller. Specifically, if a series of step functions (i.e., a square wave having a period that is long relative to the sampling interval T) is applied as a motor control signal by parameter calibration and control generator 82 (FIG. 9), and the uncompensated weigh feeding machine is measured, a series of measurement residuals can be calculated. From this series of measurement residuals, a small signal gain $GV_{ss}$, and a weight compensation factor $W_{cf}$ are then calculated, and are output to the Kalman filter for use in controlling the weigh feeding system.

Figure 12:
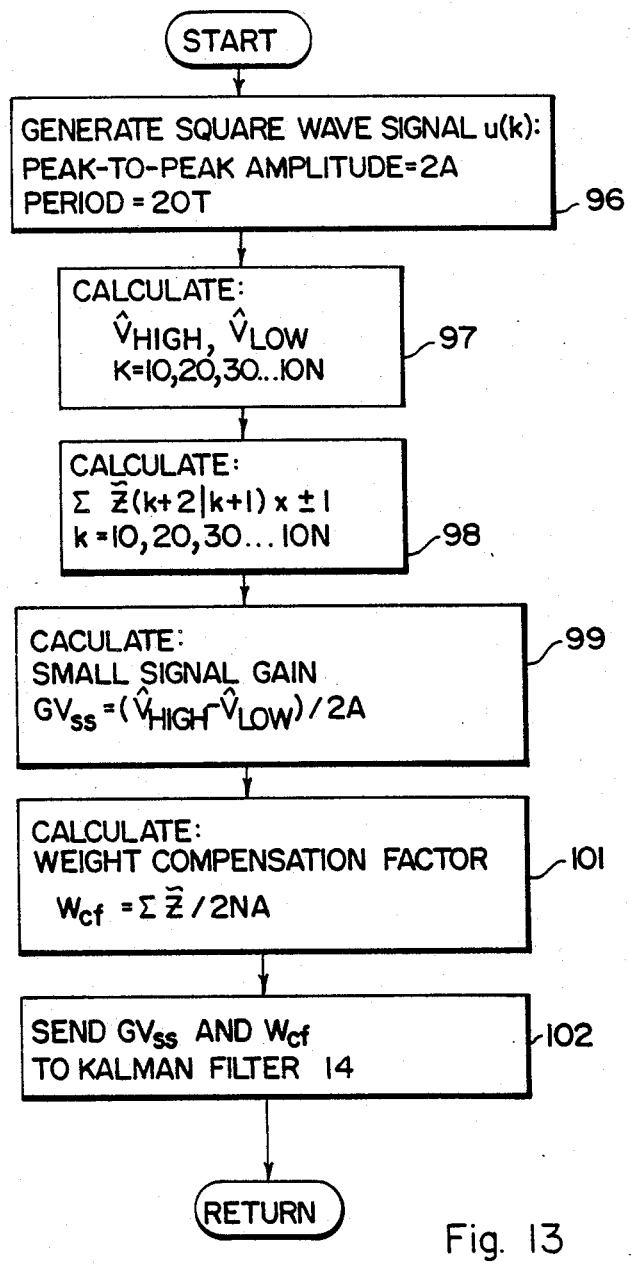
FIG. 12 is a flowchart of the computational steps performed by the present invention to calibrate control parameters.

Specifically, and with reference to the flow chart of FIG. 12, in block 96 a square wave signal, offset from zero by a desired set-point, is generated as control signal u(k) and is applied to the weigh feeding machine. The square wave has a peak-to-peak signal amplitude of 2A and a signal period of 20T where T is the sampling period. A being chosen to allow determination of system operation in the vicinity of a desired operating point (i.e., the offset of the square wave). Preferably, A is approximately 25% of the desired set-point. Thus, for example, if the desired set-point is 200, A would be 50, and the square wave u(k) would have a high valued portion of 250 and a low valued portion of 150. The square wave is repeated for N cycles, where N is preferably five or more.

The applied square wave has a high valued portion of magnitude $u_{high}$ which lasts for time 10T, followed by a low valued portion of magnitude $u_{low}$ which also lasts for a time 10T.

During application of the square wave u(k), control resides in block 97 where an average high mass flow output estimate $\hat{v}_{high}$ is calculated from a series of mass flow estimates $W_r(k)$ each determined just before the square wave u(k) makes the transition from high to low, i.e., at the end of the 10T duration of the high portion of the square wave u(k) (i.e., K=10, 20, 30 . . . 10N as shown in block 97). Also in block 97, an average low mass flow output estimate $\hat{v}_{low}$ is determined from a series of mass flow estimates $\hat{W}_r(k)$ each determined just before the square wave u(k) makes the transition from low to high, i.e., at the end of the 10T duration of the low portion of the square wave u(k).

Control then passes to block 98 where a sum of the measurement residuals are calculated. The residuals, z are generated by the difference between the actual weight measurement z and the predicted weight of the filter without compensation. In producing the sum $\Sigma \tilde{z}$, residuals calculated for each high portion of the square wave are multiplied by 1, and residuals calcuated for each low portion of the square wave are multiplied by −1.

Control then passes to block 99 where small signal gain $GV_{ss}$ is calculated using the equation:

$$GV_{ss} = (\hat{v}_{high} - \hat{v}_{low})/2A.$$

In other words, $GV_{ss}$ is equal to the difference between the high and low mass flow output estimates, divided by the peak-to-peak magnitude 2A of the applied square wave u(k).

Then, in block 101, weight compensation factor $W_{cf}$ is then calculated using the equation:

$$W_{cf} = (\Sigma \tilde{z})/2NA$$

Where:
 $\Sigma \tilde{z}$ is the sum of the measurement residuals calcuated in block 98; and
 N and A are the number of cycles and amplitude of the applied square wave.

In other words, weight compensation factor $W_{cf}$ is the average of the measurement residuals, $\tilde{z}$, normalized by magnitude A.

Then in block 102, small signal gain $GV_{ss}$ and weight compensation factor $W_{cf}$ are sent to the Kalman filter (specifically, to blocks 88 ad 93 of FIG. 11).

Turning now to the tuning of the noise parameters $\sigma^2_n$ and $\sigma^2_{w2}$, use is made of the known linear relationship existing between the plant and measurement noise variances to the predicted measurement residual variance in order to calculate estimates of the actual plant and measurement noise variances. Specifically, the weigh feeding system is controlled by parameter calibration and control generator 82 to run the weigh feeding machine at a constant speed (i.e., each value of vector u(k) is constant), and a corresponding series of measurements z(k) are taken and are fed to two constant gain filters, A and B, each with a different set of fixed known gains. From each of the filters, corresponding measurement residual variances are calculated and from these, estimates for the measurement noise variance $\sigma^2_n$ and plant noise variance $\sigma^2_{w2}$ are calculated.

Figure 13:
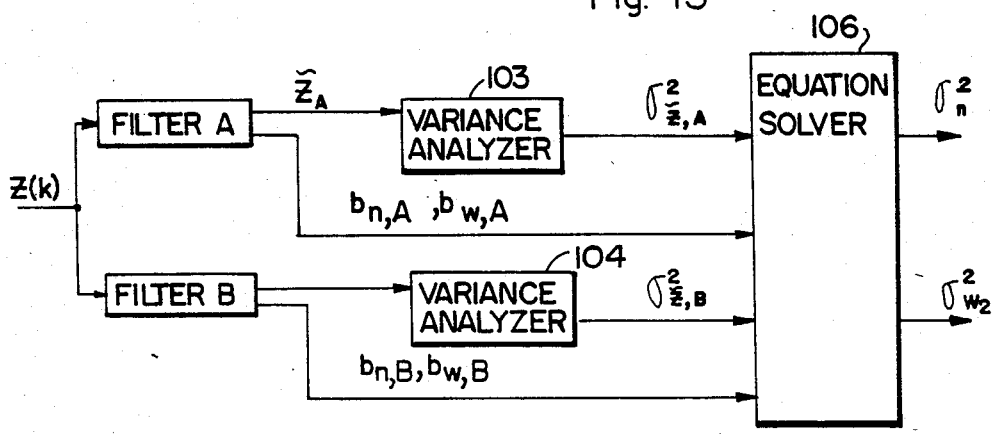
FIG. 13 is a schematic of a model of the noise parameter calibration of the present invention.

Referring to FIG. 13, the conceptual schematic of the noise parameter procedure of the present invention is disclosed. Filters A and B are structured like Kalman filters except that the gains of filters A and B are fixed and known. Each of filters A and B perform estimation and prediction, as well as control modeling, in the same manner as the Kalman filter of the main control loop described above with reference to FIGS. 4A–C and 11, except that the gains are not calculated each iteration. Also, since filters A and B have constant gains, noise parameters, $\sigma^2_n$ and $\sigma^2_{w2}$, are not used in filter A and B. However, filters A and B preferably make use of the tuned quantities $GV_{ss}$ and $W_{cf}$ determined above with reference to FIG. 12.

The measurement sequence z(k) is applied to each of filters A and B, which in turn produce respective measurement residual sequences, $z_A$ and $z_B$. Also from filters A and B are derived quantities $b_{n,A}$, $B_{w,A}$, $b_{n,B}$ and $B_{w,B}$, which are functions of the respective gains of filters A ad B. Specifically:

$$b_{n,A} = (4K_{1,A} + 2TK_{2,A})/D_A$$

$$b_{w,A} = T(2 - K_{1,A})/K_{2,A}D_A$$

$$b_{n,B} = (4K_{1,B} + 2TK_{2,B})/D_B$$

$$b_{w,B} = T(2 - K_{1,B})/K_{2,B}D_B$$

where:

$K_{1,A}$ and $K_{2,A}$ are the fixed, known gains of filter A;
$K_{1,B}$ and $K_{2,B}$ are the fixed, known gains of filter B;
$D_A = K_{1,A}(4 - 2K_{1,A} - TK_{2,A})$;
$D_B = K_{1,B}(4 - 2K_{1,b} - TK_{2,B})$; and
T is the sampling period.

In the preferred embodiment, $K_{1,A}=0.8$, $K_{2,A}=0.4$, $K_{1,B}=0.4$ and $K_{2,B}=0.2$, although other values may be used without departing from the scope of the invention.

The measurement residual variances $\sigma^2_{z,A}$ and $\sigma^2_{z,B}$ are produced by variance analyzers 103 and 104 from measurement residual sequences $z_A$ and $z_B$. The measurement residual variances are then applied to equation solver 106 in order to solve the two simultaneous equations:

$$\sigma^2_{z,A} = b_{n,A}\sigma^2_n + b_{w,A}\sigma^2_{w2}$$

$$\sigma^2_{z,B} = b_{n,B}\sigma^2_n + b_{w,B}\sigma^2_{w2}$$

for the two unknowns $\sigma^2_n$ and $\sigma^2_{w2}$.

Figure 14:
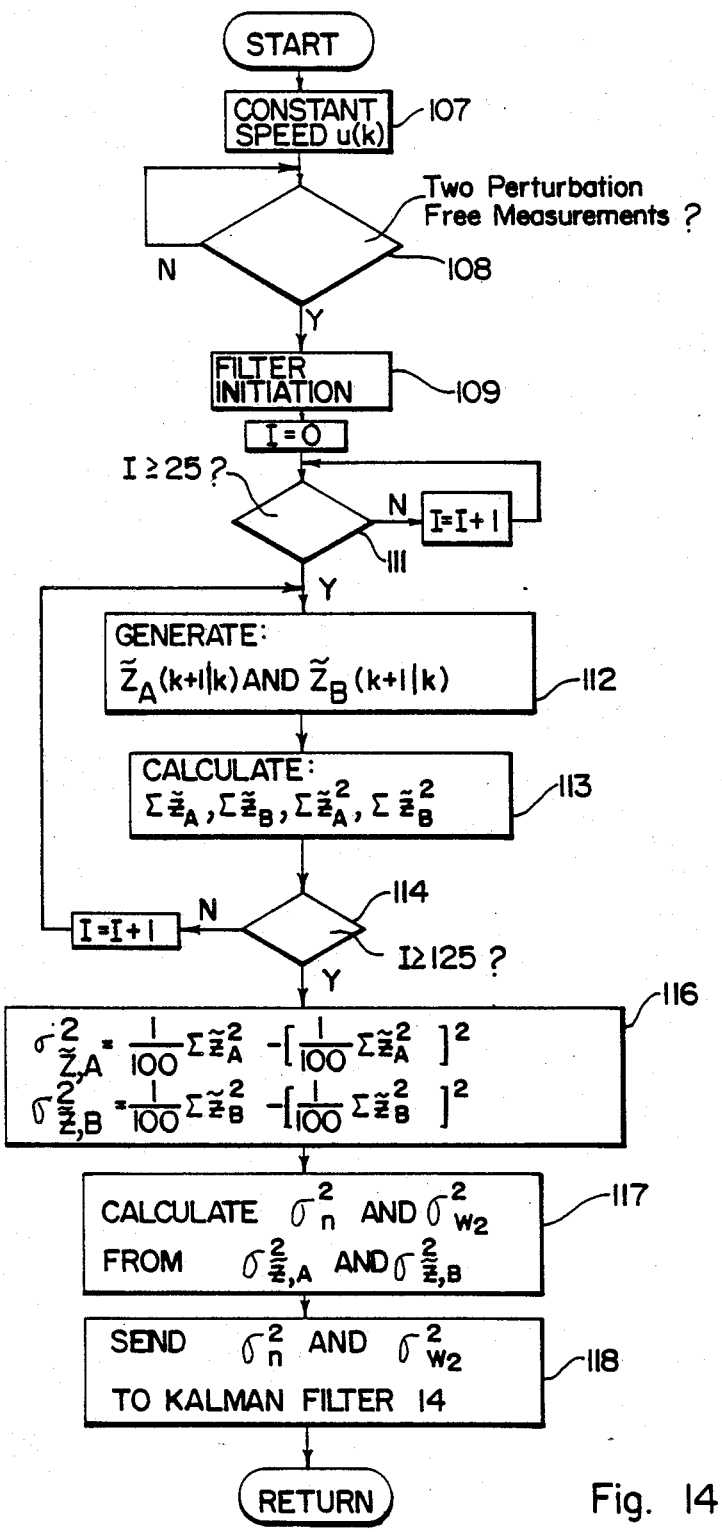
FIG. 14 is a flowchart of the computational steps performed by the present invention to calibrate noise parameters.

Referring to the flow chart shown in FIG. 14, the noise calibration algorithm of the present invention is shown. To initiate the algorithm, the weigh feeding system is run with a constant speed beginning in block 107. Decision block 108 determines if two consecutive perturbation free measurements have been taken. If so, filter initiation (similar to the filter initiation shown above in FIG. 4A and supporting text) is done for both filters A and B in step 109. Next, 25 measurement cycles are allowed to elapse by use of the looped decision block 111 in order to allow the outputs of filters A and B to settle. Then 100 measurement cycles are performed and the sum of the measurement residuals, $\Sigma z_A$ and $\Sigma z_B$, and the sum of the square of the measurement residuals, $\Sigma z^2_A$ and $\Sigma z^2_B$, are calculated for each of filters A and B in blocks 112, 113 and decision block 114. Control is then transferred to block 116 where measurement residual variances, $\sigma^2_{z,A}$ and $\sigma^2_{z,B}$, for each of the filters A and B, are calculated, and then in block 117, the measurement noise variance $\sigma^2_n$ and plant noise variance $\sigma^2_{w2}$ are calculated from the measurement residual variances $\sigma^2_{z,A}$ and $\sigma^2_{z,B}$. In block 118, the plant noise variance, $\sigma^2_n$, and measurement noise variance, $\sigma^2_{w2}$, are sent to the Kalman filter of the stochastic controller.

100 samples are used to calculate the measurement noise variance and plant noise variance in order to achieve confidence levels of within 10% of their respective real values with 95% probability.

Thus the control parameter calibration procedure requires approximately 120 measurement cycles, and the noise parameter calibration procedure requires approximately 125 measurement cycles, for a total calibration time of from four to six minutes in the preferred embodiment.

The present invention has provisions to noise calibrate in the mass mode. To do this, the small signal gain $GV_{ss}$ and weight compensation factor $W_{cf}$ parameters must be calibrated and included in Filters A and B. The control u(k) is then allow to vary as in the previously described set-point control manner. The noise calibration for $\sigma^2_n$ and $\sigma^2_{w2}$ as previously described will then follow. Changes to previously described figures for noise calibration are: FIG. 9 switch 81 can be in the "RUN" position, and FIG. 14 block 107 is bypassed. The enclosed source code has this feature as noted by statement numbers 21900 to 22020 and statement 23750. This process enhances the versatility of this invention and allows for noise calibration or recalibration during the mass mode of control.

The following is a commented source code listing of a source code program for computer 15 of the preferred embodiment including self-tuning calibration. This progrsm incorporates the steps shown in the flow charts of FIGS. 4B, 4C 10–12 and 14.

Copyright 1988, K-Tron International, Inc.

```
800 REM disp702 kalman tuning while mass control
900 DIM ZRESA(500),ZRESB(500),SIGN2(500),SIGW2(500),TDAVG(500)
905 DIM ZAAVE(500),ZBAVE(500)
910 FOR I=0 TO 500
920 ZRESA(I) =0:ZRESB(I) =0:SIGN2(I)=0:SIGW2(I)=0:TDAVG(I)=0
930 NEXT
935 GSTART%=50
940 CALFLAG%=0
942 SSWCOMPF=0:SSVCGAIN=0
945 IADD=50 : REM iADD=IADD/10
946 CORR=-1:SUM2=0:VSUMLOW=0:VSUMHIGH=0:IIFLAG%=0:IILOWCOUNT=0
:IIHIGHCOUNT=0
```

```
947 FAC=-1
950 AN=2.5: AW=1.875: BN=1.666667:BW=6.666667:DELTA=13.54167
1000 ' program to compute noise variance
1100 ' This program has three filters running in parallel
1200 ' one for motor control and two for noise variance computation
1300 'L = CONVERSION WINDOW LENGTH
1400 'I = MOTOR DRIVE COMMAND AS I= HZ.
1500 'WT = WEIGHT COUNT ; WERR = WEIGHT ERROR INDICATOR
1600 'TS = TIME STAMP ; DTS = MEASURED SAMPLE TIME
1700 'MP = MOTOR POSITION
1800 'FR = FULL SCALE FEEDRATE
1900 'SP = SET POINT
2000 'FSC = FULL SCALE CAPACITY
2100 'OPEN COMMUNICATIONS WITH THE OUTSIDE WORLD
2200 'OPEN COMMUNICATIONS FILE#1 (128 BYTES) FOR ACA-1 AT 9600 BAUD,
2300 'ODD PARITY, 8 DATA BITS, ONE STOP BIT, NO 'CLEAR TO SEND',
2400 'NO 'DATA SET READY', PARITY CHECKING DISABLED.
2500 CLS: PRINT "KALMAN FILTER ALGORITHM"
2600 OPEN "com1: 9600,N,8,1,CS,DS" AS #1
2700 GOSUB 16900   'ENTRANCE POINT FOR INITIALIZATION ONLY. LOOP USES
2800
2800 GOSUB 18100   'INITIALIZE ANALYZER
2900 GOSUB 16400   'WRITES A RESET TO THE I/O BOARD VIA THE PORT
3000 GOSUB 15300   'BUILDS A SETF$
3100 GOSUB 25300 ' initialize double filters
3200 CGAIN = .2: CTIME% = 15: NSIG = 50: VDSIG = 25: T = 1: VDESIRE = -200
3250 REM vDESIRE=-20
3300 F$ = "TEMP":FF=.35: CFLAG=0 'FF=FEED FACTOR (VELOCITY/M.SPEED
COMMAND) AND T=APPROX SAMPLE TIME
3350 REM ff=.01
3400 FSC = 60        'FULL SCALE CAPACITY IN KG
3500 REM PRINT " "
3600 INPUT "  CGAIN... THE DEFAULT VALUE IS 0.2";I
3700 REM IF I = 0 THEN 4300
3800 REM IF (I > 0) AND (I < 1!) THEN 4100
3900 REM PRINT "UNACCEPTABLE ENTRY FOR CGAIN. USE VALUE BETWEEN 0
AND 1":BEEP
4000 REM GOTO 3500
4100 CGAIN=.2 'NOT USED IN VOLUMETRIC
4200 PRINT:PRINT " THE KALMAN FILTER IS ACTIVATED AFTER 5 SAMPLES"
4300 REM PRINT" LOOP COUNT WHERE MOTOR CONTROL STARTS, I=20":I=20
4400 ' INPUT "ENTER CONTROL TIME DELAY(TDELAY) ";TDELAY
4500 ' INPUT "ENTER MOTOR ACTIVATION DELAY (TAU) ";TAU
4600 ' IF I<>0 THEN CTIME%=I
4700 PRINT " ":INPUT "INPUT WEIGHT NOISE S.D., DEFALULT = 50";I
4800 IF I <> 0 THEN NSIG = I
4900 PRINT " ":INPUT "INPUT VELOCITY DESIRED S.D., DEFAULT = 25";I
5000 IF I <> 0 THEN VDSIG = I
5100 PRINT
5200 I=0!:INPUT "ENTER MOTOR SPEED (DMT WC/SEC) run in volumetric" ;ITEMP
5250 REM LPRINT "MOTOR SPEED (DMT WC/SEC) run in volumetric  " ;ITEMP:LPRINT
5300 IF ITEMP<>0 THEN I=ABS(ITEMP)
5400 STARTI% = -INT(I)
5500 I = -ABS(I/FF) 'MAKE SURE IT IS NEG.
5530 PRINT " ":INPUT "INPUT MODEL CALIB. START 'GSTART%' , DEFALULT =
50";I7
5540 IF I7 <> 0 THEN GSTART% = I7
5560 PRINT " ":INPUT "INPUT OSCILLATION MAGNITUDE 'IADD' , DEFALULT =
50";I7
5570 IF I7 <> 0 THEN IADD = I7
5600 PRINT :INPUT "ENTER THE OUTPUT DATA FILE NAME, DEFAULT =
'TEMP'";A$
5700 IF A$ <> "" THEN F$ = A$
5800 CLS
5900 PRINT "************************ RUN
PARAMETERS************************"
6000    REM PRINT
6100 PRINT " CGAIN"," NSIG"," VDSIG"," CTIME"," STARTI    F$"
6200 PRINT CGAIN,NSIG,VDSIG,CTIME%,STARTI%
6300 LOCATE 4,49: REM LOCATE 4,69
6400 PRINT F$
6500 '
6600 LOCATE 5,1: REM LOCATE 7,1
```

```
6700 PRINT "************************* SYSTEM STATUS***************************"
6800 REM PRINT:
6850 PRINT " COUNT","SETPOINT","T.STAMP","DMT W.CNTS","M.SPEED"
6900 LOCATE 10,1:REM LOCATE 13,1
7000 PRINT "********************* FILTER CHARACTERISTICS*********************"
7100    REM PRINT:
7150 PRINT " W.C.PRED","FLOWRATE","GAIN 1     GAIN 2    DEL T"
7200 LOCATE 15,48:PRINT "PERTURBATION"
7300 LOCATE 16,1:REM LOCATE 19,1
7400  PRINT "** OPTIONS **   ENTER 'S' TO CHANGE SETPT., ENTER 'H' TO HALT"
7500 GOSUB 20100
7600 OPEN "c:"+F$ AS #2 LEN=59
7700 FIELD #2, 7 AS FT$, 7 AS FX$, 9 AS FXH$, 7 AS FV$, 5 AS FK1$, 5 AS FK2$,5 AS FI$,7 AS FMS$,7 AS FZRES$
7800 GOSUB 14100      'SENDS A WINDOW LENGTH COMMAND
7900 GOSUB 15300
8000 GOSUB 14500 'SEND "START READ WEIGHT" COMMAND
8100 '--------------BEGINNING OF LOOP-------------------------------
8200 FOR LUP%=1 TO 1070
8250 REM IF abort=1 THEN 10800
8300 A$=INKEY$:IF A$=""THEN 9000
8400 IF (A$="S") OR (A$ = "s") THEN 8700     : REM change the set point
8500 IF (A$="H") OR (A$ = "h") THEN 10800    : REM halt the machine
8550 IF (A$="C") OR (A$ = "c") THEN CALFLAG%=1 : REM Kalman filter calibrate
8560 IF (A$="G") OR (A$ = "g") THEN GSTART%=LUP%  : REM small signal calibrate
8600 GOTO 9000
8700 SCONT%=1:TDADD=TIMER:LOCATE 10,1: LOCATE 18,1
8800 INPUT"ENTER NEW SETPOINT. THE UNITS ARE (DMT WEIGHT COUNTS)/SEC";SP
8900 VDESIRE=-ABS(SP) 'I=VELOCITY OR FLOW RATE
9000 T0 = TIMER:REM TDADD=TIMER-TDADD : T0 = TIMER
9100 PRINT #1,RED$  'SEND A "READ AND START WEIGHT" COMMAND
9200 GOSUB 11300       'DO MATH
9300 GOSUB 12200
9400 GOSUB 18300
9500 Z=WT:IF LUP%=CTIME% THEN CFLAG=1
9600 IF LUP%=4 THEN ZPAST=WT
9700 IF LUP%=5 THEN GOSUB 24500 'INITIAL FILTER (N=0)
9800 IF LUP%>5 THEN GOSUB 21800 'KALMAN FILTER
9810 REM IF (LUP% >= 25) AND (DINIT <2 ) THEN GOSUB 24700 'init double filters
9820 IF (CALFLAG%=1) AND (DINIT <2 ) THEN GOSUB 24700 'init double filters
9900 REM iF I = SAVEDI THEN 10200       'I IS MOTOR DRIVE COMMAND FREQUENCY
10000 SAVEDI=I:GOSUB 15300   'REBUILD A NEW MOTOR SPEED COMMAND AND SEND IT
10100 'DELAY 1/2 SECOND INCLUDING PROGRAM EXECUTION TIME
10200 REM T0=.022*L+.043 + T0 : REM T0=.022*L+.043 + T0
10300 LSET FT$=STR$(TS):LSET FX$=STR$(WT):LSET FXH$=STR$(INT(XHAT)):LSET FV$=STR$(INT(VHAT))
10400 LSET FK1$=STR$(INT(K1*1000)):LSET FK2$=STR$(INT(K2*1000!))
10450 LSET FI$=STR$(INT(I)):LSET FMS$=STR$(MP):LSET FZRES$=STR$(ZRES)
10500 PUT #2,LUP%+1
10600 IF TIMER<=T0 THEN 10600
10650 REM FOR BI=1 TO 1800: NEXT
10700 NEXT
10800 LSET FT$=STR$(LUP%-1)
10900 PUT #2,1:CLOSE #2
11000 I=0:GOSUB 15300:GOSUB 28200
11100 '--------------END OF LOOP----------------
11200 ' DELAY FOR ABOUT 0.1 SEC
11300 TX=TIMER + .12
11400 IF TIMER <TX THEN 11400
11450 REM FOR BI=1 TO 800 : NEXT
11500 RX$=""
11600 WHILE NOT EOF(1)
11700 I$=INPUT$(LOC(1),#1)
11800 WEND
11900 RX$=I$
12000 RETURN
```

```
12100 '*********************************************************
12200 W$=MID$(RX$,32,2)+MID$(RX$,37,2)+MID$(RX$,42,2)
12300 WT=VAL("&H"+MID$(W$,6,1))+VAL("&H"+MID$(W$,5,1))*16+VAL("&H"+MID$(W$,4,1))*256+VAL("&H"+MID$(W$,3,1))*4096!+VAL("&H"+MID$(W$,2,1))*65536!
12400 WT=VAL("&H"+MID$(W$,1,1))*65536!*16! + WT
12500 WT=WT-TARE
12600 WERR=VAL("&H"+MID$(W$,1,1))AND 8
12700 IF WERR THEN 12800 ELSE 12900
12800 REM LOCATE 21,1:PRINT "WEIGHT ERROR @ ";LUP%
12850 LOCATE 11,1:PRINT "WEIGHT ERROR @ ";LUP%
12900 T$=MID$(RX$,47,2)+MID$(RX$,52,2)+MID$(RX$,57,2)
13000 TS=(VAL("&H"+MID$(T$,6,1)))+VAL("&H"+MID$(T$,5,1))*16+VAL("&H"+MID$(T$,4,1))*256+VAL("&H"+MID$(T$,3,1))*4096
13100 TS=(TS+VAL("&H"+MID$(T$,2,1))*65536!+VAL("&H"+MID$(T$,1,1))*1048576!)*.00001953125#
13200 TD=TS-SAVEDTS : SAVEDTS=TS
13300 IF TD=0 THEN TD=1
13350 IF TD<0 THEN TD=TD+327.68 : REM time wrap-around
13400 M$=MID$(RX$,62,2)+MID$(RX$,67,2)
13500 OLDMP = MP
13600 MP=VAL("&H"+MID$(M$,4,1))+VAL("&H"+MID$(M$,3,1))*16+VAL("&H"+MID$(M$,2,1))*256+VAL("&H"+MID$(M$,1,1))*4096
13700 DELMP = MP-OLDMP
13800 IF (DELMP <= 0) OR (TD <= 0) THEN 14000
13900 MSPEED = DELMP/TD
14000 RETURN
14100 '*********************************************************
14200 PRINT #1,LENG$
14300 GOSUB 11300
14400 RETURN
14500 PRINT #1,STT$
14600 GOSUB 11300
14700 RETURN
14800 PRINT #1,RED$
14900 GOSUB 11300
15000 RETURN
15100 '*********************************************************
15200 'BUILD A NEW MOTOR SPEED COMMAND AND SEND IT TO THE PORT
15300 ITEMP%=-INT(I)
15400 IF ITEMP%<0 THEN ITEMP%=0
15500 MJR$=HEX$(((ITEMP%\128)AND 127)OR 128)
15600 MNR$=HEX$((ITEMP% AND 127)OR 128)
15700 CHA$=HEX$(((ITEMP%\16384)AND 3)OR 12)
15800 SETF$="'83"+"0"+CHA$+MJR$+MNR$+CHR$(3)+CHR$(16)
15900 PRINT #1,SETF$
16000 GOSUB 11300
16100 RETURN
16200 '*********************************************************
16300 'WRITE A RESET COMMAND TO THE PORT
16400 PRINT #1,REST$
16500 GOSUB 11300
16600 RETURN
16700 '*********************************************************
16800 'ENTRANCE FOR INITIALIZATION ONLY!!
16900 REM L=48:SAVEDL=L: DELAY=.1
16950 L=45:SAVEDL=L: DELAY=.1
17100 TARE=1000000!
17200 I=0!:SAVEDI=I
17300 ANASET$=CHR$(9)+CHR$(13)+CHR$(18)+"1"
17400 LDL$=HEX$(L)
17500 RED$="'8B"+"00"+CHR$(3)+CHR$(16)
17600 REST$="'87"+"00"+CHR$(3)+CHR$(16)
17700 LENG$="'86"+"01"+LDL$+CHR$(3)+CHR$(16)
17800 STT$="'86"+"00"+CHR$(3)+CHR$(16)
17900 RETURN
18000 '*********************************************************
18100 PRINT #1,ANASET$
18200 RETURN
```

```
18300 IF (CFLAG) THEN CURSTP=VDESIRE ELSE CURSTP=STARTI%
18400 LOCATE 7,1: REM LOCATE 10,1
18500 PRINT LUP%,CURSTP,TS,WT,MSPEED
18600 RETURN
18700 '************ PRINT DATA IN A FILE ****************************
18800 INPUT"WHAT FILE NAME";F$
18900 OPEN "c:"+F$ AS #2 LEN=59
19000 FIELD #2, 7 AS FT$, 7 AS FX$, 9 AS FXH$, 7 AS FV$, 5 AS FK1$, 5 AS FK2$,5
AS FI$,7 AS FMS$,7 AS FZRES$
19100 GET #2,1
19200 F1=VAL(FT$)
19300 PRINT "FILE NAME IS ";F$,TIME$,DATE$
19400 PRINT:PRINT" #  TIME   X_MEAS   X_HAT   V_HAT   K1    K2 M.SPD
M.POS  ZRES"
19405 LPRINT:LPRINT" #  TIME   X_MEAS   X_HAT   V_HAT   K1    K2 M.SPD
M.POS  ZRES"
19500 FOR I=2 TO F1
19600 GET #2,I
19700 PRINT (I-1);" ";FT$;" ";FX$;" ";FXH$;" ";FV$;" ";FK1$;" ";FK2$;"";FI$;"
";FMS$;" ";FZRES$
19750   LPRINT (I-1);" ";FT$;" ";FX$;" ";FXH$;" ";FV$;" ";FK1$;" ";FK2$;"";FI$;"
";FMS$;" ";FZRES$
19800 NEXT I
19900 CLOSE #2:STOP
20000 '****** COMPUTE DESIRED VELOCITY STANDARD DEVIATION ***********
20100 NSIG2=NSIG*NSIG
20200 VDSIG2=VDSIG*VDSIG
20300 AA=VDSIG2*T*T/NSIG2
20400 A=.5:AX=.5
20500 FOR K%=1 TO 30
20600  FX=A^3/((1!-A)*(2!-A))
20700  A=A-AX*(1!-AA/FX)/(3!/A+1!/(1!-A)+1!/(2!-A))
20800  IF A>1! THEN A=.9
20900  IF A<0! THEN A=.1
21000  B=A*A/(2!-A)
21100 NEXT
21200 VSIG2=NSIG2*B*B/(T*T*(1!-A))
21300 VSIG=SQR(VSIG2)
21350 LPRINT:   LPRINT "initial nsig2 and vsig2 "; :LPRINT USING " ####.#";NSIG2,
VSIG2
21400 RETURN
21500 '***************** KALMAN FILTER ************************
21600 IF SCONT2%=1 THEN TD=TD-TDADD:SCONT2%=0
21700 IF SCONT%=1 THEN TD=TD+TDADD:SCONT%=0:SCONT2%=1
21800 XHATPRED=XHAT+TD*VHAT:VHATPRED=VHAT
21850 REM IF LUP% >125 THEN XHATPRED=XHATPRED+VCPAST*SSWCOMPF
21852        XHATPRED=XHATPRED+VCPAST*SSWCOMPF
21860 REM IF LUP% >125 THEN VHATPRED=VHATPRED+VCPAST*SSVCGAIN
21862        VHATPRED=VHATPRED+VCPAST*SSVCGAIN
21900 XAHATPRED = XAHAT+TD*VAHAT : VAHATPRED=VAHAT
21910        XAHATPRED=XAHATPRED+VCPAST*SSWCOMPF
21920        VAHATPRED=VAHATPRED+VCPAST*SSVCGAIN
22000 XBHATPRED = XBHAT+TD*VBHAT : VBHATPRED = VBHAT
22010        XBHATPRED=XBHATPRED+VCPAST*SSWCOMPF
22020        VBHATPRED=VBHATPRED+VCPAST*SSVCGAIN
22200 ZRES=Z-XHATPRED
22300 ZRESA = Z - XAHATPRED
22400 ZRESB = Z - XBHATPRED
22500 PP11=P11+(2!*TD*P12)+(TD*TD*P22):PP12=P12+TD*P22 :PP22=P22+VSIG2
22600 PPZ=PP11+NSIG2:Z2TH=25!*PPZ
22700 K1=PP11/(PP11+NSIG2):K2=PP12/(PP11+NSIG2)
22800 P11=(1!-K1)*PP11:P12=(1!-K1)*PP12:P22=PP22-(K2*PP12)
22900 IF (LUP% >KXX%) AND (ABS(ZRES)>(3*PPZ)) THEN CALFLAG%=0
22940 IF (LUP% >KXX%) AND (ABS(ZRES)>(3*PPZ)) THEN LPRINT "fall out of kalman
calibration: cycle ";LUP%
22950 IF (ZRES)>(3*PPZ) THEN ZTHF%=1
23000 IF ZTHF%=0 THEN 23400
23100 REM LOCATE 16,69:PRINT "## ";LUP%;" ##":MP=-ABS(MP)
23150 LOCATE 16,39:PRINT "## ";LUP%;" ##":MP=-ABS(MP)
23200 Q11=ZRES*ZRES/12!
23300 PP11=PP11+Q11:ZTHF%=0:GOTO 22600
```

```
23400 XHAT=XHATPRED+K1*ZRES : VHAT=VHATPRED+K2*ZRES
23500 XAHAT=XAHATPRED+K1A*ZRESA : VAHAT=VAHATPRED+K2A*ZRESA
23600 XBHAT=XBHATPRED+K1B*ZRESB : VBHAT=VBHATPRED+K2B*ZRESB
23650 IF LUP% < GSTART% THEN GOTO 24250
23700 IF LUP% > KXX% THEN GOSUB 26500 'compute coeff for variance of residual
23750 REM IF CALFLAG% >0 THEN GOTO 24250 : rem REMARKING this statement
 permits Kalman Calibration in the mass mode
23800 REM VCERROR=VDESIRE-VHAT:VCPAST=VCTEMP:ZPAST=Z
23850 VCERROR=VDESIRE-(VHAT+VCTEMP*SSVCGAIN):VCPAST=VCTEMP
 :ZPAST=Z
23900 REM VCTEMP=CGAIN*VCERROR*CFLAG
23910 CGAINV=CGAIN
23920 IF ABS(VCERROR) > ABS(.75*VDESIRED) THEN CGAINV=.9
23950 VCTEMP=CGAINV*VCERROR*CFLAG
24000 I=I+VCTEMP/FF
24020 REM IF LUP% > 175 THEN 24100
24022 IF LUP% > (175+GSTART%) THEN 24100
24025 VCTEMP=0
24030 IF (LUP% MOD 10) <> 0 THEN 24060
24031 VCTEMP=2*IADD
24033 IADD=-IADD
24034 REM IF LUP%>125 THEN 24060
24036 IF LUP%>(125+GSTART%) THEN 24060
24038 FAC=FAC*CORR
24052 IF IIFLAG%=1 THEN VSUMLOW=VSUMLOW+VHAT
24053 IF IIFLAG%=1 THEN IILOWCOUNT=IILOWCOUNT+1
24054 IF IIFLAG%=0 THEN VSUMHIGH=VSUMHIGH+VHAT
24055 IF IIFLAG%=0 THEN IIHIGHCOUNT=IIHIGHCOUNT+1
24056 IIFLAG%=(IIFLAG%+1) MOD 2
24060 I=-(ABS(ITEMP)+IADD)/FF
24100 IF I>0! THEN I=0!:VCTEMP=0!
24140 REM IF LUP% < 20 THEN 24200
24142 IF LUP% <(20+GSTART%) THEN 24200
24145 REM IF LUP%>125 THEN 24200
24147 IF LUP%>(125+GSTART%) THEN 24200
24150 IF LUP% MOD 10 =2 THEN SUM2=SUM2+ZRES*FAC
24200    REM LOCATE 16,1:PRINT USING "######.###
";XHAT,VHAT,K1,K2,TD,ZRES
24250 LOCATE 13,1:PRINT USING "######.###  ";XHAT,VHAT,K1,K2,TD,ZRES
24255 REM IF LUP% <> 125 THEN 24300
24257 IF LUP% <>(125+GSTART%) THEN 24300
24260 II=INT((LUP%-10)/10)
24265 II=INT((LUP%-10-GSTART%)/10)
24275 REM
SSVCGAIN=ABS(VSUMHIGH/IIHIGHCOUNT-VSUMLOW/IILOWCOUNT)/100
24277
SSVCGAIN=ABS((VSUMHIGH/IIHIGHCOUNT-VSUMLOW/IILOWCOUNT)/(2*IADD))
24280 REM SSWCOMPF=ABS((SUM2/II)/(100*SSVCGAIN))
24282 SSWCOMPF=ABS((SUM2/II)/(2*IADD*SSVCGAIN))
24285 LOCATE 15,1:PRINT " small signal velocity gain ";SSVCGAIN
24287 LOCATE 16,1:PRINT " weight compensation factor ";SSWCOMPF
24290        LPRINT " small signal velocity gain ";SSVCGAIN
24295        LPRINT " weight compensation factor ";SSWCOMPF
24300 RETURN
24400 'INITIAL FILTERING
24500 ZTHF%=0 : P11=NSIG2:P22=(2!*NSIG2/(TD*TD))+VSIG2:P12=NSIG2
24600 XHAT=Z:VHAT=(Z-ZPAST)/TD:XHATPRED = XHAT+VHAT*TD
24640 VCERROR = 0
24650 GOTO 24800
24700 IF ZRES*ZRES >PPZ THEN RETURN
24720 DINIT=DINIT+1
24730 IF DINIT = 1 THEN RETURN ' when dinit=2 then initialize
24800 XAHAT=XHAT:VAHAT=VHAT:XBHAT=XHAT:VBHAT=VHAT
24850 IF DINIT =2 THEN KXX%=LUP%+25 : CALSTOP=KXX%+100
 : REM dinit = 0
25200 RETURN
25300 REM INPUT "FILTER A: GAINS ";K1A,K2A
25350 K1A=.8 : K2A=.4
25400 REM INPUT "FILTER B: GSINS ";K1B,K2B
25450 K1B=.4 : K2B=.2
25500 PRINT "noise computation time starts @50 ":KXX%=1250
:REM KXX%=250
```

```
25550 RETURN
25600 REM TDSUM = TDSUM + TD
25620 REM TDAVG = TDSUM/(lup% - kxx%)
25625 REM IF lup% <= kxx% + 10 THEN TDAVG = TDAVG + .05
25700 REM IF lup% <> kxx%+10 THEN GOTO 26500
25710 REM ** note the setting of t-ave
25720 REM TDAVG=1!
25800 REM DA=K1A*(4-2*K1A-TDAVG*K2A)
25900 REM DB=K1B*(4-2*K1B-TDAVG*K2B)
26000 REM aw=TDAVG*(2-K1A)/(K2A*DA)
26100 REM an=(4*K1A+2*TDAVG*K2A)/DA
26200 REM bw=TDAVG*(2-K1B)/(K2B*DB)
26300 REM bn=(4*K1B+2*TDAVG*K2B)/DB
26400 REM delta =an*bw-aw*bn
26500 IF CALFLAG% = 0 THEN RETURN
26555 ZRASUM = ZRASUM+ZRESA
26600 ZRBSUM = ZRBSUM+ZRESB
26700 ZR2ASUM=ZR2ASUM+ZRESA*ZRESA
26800 ZR2BSUM=ZR2BSUM+ZRESB*ZRESB
26850 REM IF lup% < kxx% + 10 THEN RETURN
26900 KYY% = LUP% - KXX%
26950 KYY=KYY%
27000 AVEZRA=ZRASUM/KYY
27100 AVEZRB=ZRBSUM/KYY
27150 ZAAVE(KYY%)=AVEZRA
27155 ZBAVE(KYY%)=AVEZRB
27200 VARZRA=ZR2ASUM/KYY-AVEZRA*AVEZRA
27300 VARZRB=ZR2BSUM/KYY-AVEZRB*AVEZRB
27500 SIGN2=(VARZRA*BW-VARZRB*AW)/DELTA
27600 SIGW2=(-VARZRA*BN+VARZRB*AN)/DELTA
27700 REM ** note the special change in storrage
27800 ZRESA(KYY%)=VARZRA : ZRESB(KYY%) = VARZRB
27900 SIGN2(KYY%)=SIGN2 : SIGW2(KYY%) = SIGW2
27950 TDAVG(KYY%)=TDAVG
28100 IF LUP% < CALSTOP% THEN RETURN
28102 SIGW2MIN=(.01*ITEMP)^2
28103 IF SIGW2 > SIGW2MIN THEN 28112
28104 PRINT "minimum feeding variance: ",SIGW2MIN : LPRINT "minimum feeding variance: ",SIGW2MIN
28106 SIGN2A=(ZRESA(100)-AW*SIGW2MIN)/AN
28108 SIGN2B=(ZRESB(100)-BW*SIGW2MIN)/BN
28110 SIGN2=.5*(SIGN2A+SIGN2B) :SIGW2 = SIGW2MIN
28112 NSIG2=SIGN2 : VSIG2 = SIGW2
28114 CALFLAG%=0: KXX%=10000:ZRASUM=0:ZRBSUM=0:ZR2ASUM=0:ZR2BSUM=0:REM RETURN
28115 DINIT=0
28116 LOCATE 17,1:PRINT "new nsig2 and vsig2 "; :PRINT USING " ####.#"; NSIG2, VSIG2
28120 LPRINT:  LPRINT "new nsig2 and vsig2 "; :LPRINT USING " ####.#";NSIG2, VSIG2
28130 RETURN
28200 CLS: INPUT"Do you wish to print residue and noise variance? ";Y$
28220 IF Y$="y" OR Y$="Y" THEN 28230 ELSE STOP
28230 PRINT " i    var-A   var-B   sign2   sigw2   var-Avar-B" "
28231 LPRINT " AN: ";AN," AW: ";AW : LPRINT " BN: ";BN," BW: ",BW
28232 LPRINT "DELTA: ";DELTA
28233 LPRINT " i    var-A   var-B   sign2   sigw2   T-avevar-A   var-B"
28235 FOR I% = 1 TO KYY%
28240 REM PRINT i%;" ";ZRESA(i%);" ";ZRESB(i%);" ";sign2(i%);" ";SIGW2(i%);"";TDAVG(i%)
28245 PRINT I%;USING "#####.###";ZRESA(I%),ZRESB(I%), SIGN2(I%),SIGW2(I%),TDAVG(I%),ZAAVE(I%),ZBAVE(I%)
28247 LPRINT I%;:LPRINT USING "#####.###";ZRESA(I%),ZRESB(I%), SIGN2(I%),SIGW2(I%),TDAVG(I%),ZAAVE(I%),ZBAVE(I%)
28250 NEXT I%
28255 PRINT "measurement noise variance: ",SIGN2(100)
28257 PRINT "feeding noise variance: ",SIGW2(100)
28258 PRINT "measurement noise variance: ",SIGN2(100)
28259 LPRINT "feeding noise variance: ",SIGW2(100)
28260 IF SIGW2(100)>0 THEN 28270
28262 REM ** minimum feeding noise = 0.5% * operating rate
```

```
28264 SIGW2MIN=(.01*ITEMP)^2 : REM sigw2min=(.005*itemp)^2
28265 PRINT "minimum feeding variance: ",SIGW2MIN : PRINT "minimum feeding
variance: ",SIGW2MIN
28266 SIGN2A=(ZRESA(100)-AW*SIGW2MIN)/AN
28267 SIGN2B=(ZRESB(100)-BW*SIGW2MIN)/BN
28268 SIGN2AVE=.5*(SIGN2A+SIGN2B)
28269 PRINT "measurement noise variance: ",SIGN2A,SIGN2B,SIGN2AVE :
LPRINT"measurement noise variance: ",SIGN2A,SIGN2B,SIGN2AVE
28270 REM II=INT((LUP%-10)/10)
28271 PRINT "number of cycles of averaging: ";II
28272 LPRINT "number of cycles of averaging: ";II
28274 PRINT "weight conversion factor: ";SUM2/II
28300 PRINT " average high velocity: ",VSUMHIGH/IIHIGHCOUNT
28302 LPRINT " average high velocity: ",VSUMHIGH/IIHIGHCOUNT
28350 PRINT " vsumlow: ", VSUMLOW
28370 PRINT " average low velocity: ",VSUMLOW/IILOWCOUNT
28372 LPRINT " average low velocity: ",VSUMLOW/IILOWCOUNT
28380 REM
SSVCGAIN=ABS(VSUMHIGH/IIHIGHCOUNT-VSUMLOW/IILOWCOUNT)/100
28390 PRINT "small signal velocity command gain: ";SSVCGAIN
28392 LPRINT "small signal velocity command gain: ";SSVCGAIN
28400 REM SSWCOMPF=(SUM2/II)/(100*SSVCGAIN)
28410 PRINT "small signal weight compensation factor: ";SSWCOMPF
28412 LPRINT "small signal weight compensation factor: ";SSWCOMPF
28420 VCOMP=100*SSVCGAIN
28430 WCOMP=SSWCOMPF*VCOMP
28440 PRINT "velocity compensation factor: ";VCOMP
28450 PRINT "weight compensation factor: ";WCOMP
28990 GOTO 18700
29000 STOP
```

While the invention has been described by reference to a specific illustrative embodiment thereof, many changes and modifications of the invention may become apparent to those skilled in the art without departing from the spirit and scope of the invention.

I claim:

1. A method for weigh feeding material comprising the steps of:
   storing a quantity of material;
   discharging said material according to a control amount;
   sensing a weight of said stored material or said material being discharged;
   automatically calibrating a control model which relates an amount of material being discharged to said control amount;
   automatically calibrating a noise model of at least one noise process which causes said sensed weight to differ from an actual weight state;
   deriving an estimate of said actual weight state of said weighed material, and an estimate of an actual mass flow state of the material being discharged, from said sensed weight using said noise model and said control model;
   determining a difference between said estimate of said actual mass flow state and a desired mass flow state; and
   controlling said discharge of material using said difference to maintain said actual mass flow state at said desired mass flow state.

2. A method as recited in claim 1 further comprising the step of repetitively deriving new estimates of the actual mass flow state in accordance with said deriving step.

3. A method as recited in claim 2, wherein said noise model is stochastic and includes a model of at least one plant noise process and a model of at least one measurement noise process.

4. A method as recited in claim 3 wherein said step of automatically calibrating said noise model includes the steps of:
   discharging said material at a material mass flow rate;
   sensing a weight of said stored material or of said material being discharged at said material mass flow rate;
   filtering said sensed weight with first and second filters having respective first and second sets of constant gains, to produce first and second weight estimates of an actual weight state of said material stored or of said material being discharged;
   determining respective first and second differences between said sensed weight and said first and second weight estimates;
   calculating variances of said first and second differences;
   calculating a variance of said at least one measurement noise process from said first and second variances; and
   calculating a variance of said plant noise process from said first and second variances.

5. A method as recited in claim 2, wherein said step of automatically calibrating said control model includes the steps of:
   controlling said discharge of material at alternating first and second desired rates of discharge;
   sensing a weight of the stored material or the material being discharged at said first and second desired rates of discharge;
   deriving respective first and second estimates of an actual weight of said weighed material and first and second estimates of an actual mass flow rate of material being discharged at said first and second desired rates of discharge, from said sensed weight;
   calculating a small signal gain of said control model from said respective first and second estimates of said first and second rates;

determining differences between said sensed weight and said first and second estimates of said actual weight;
calculating an average of said differences; and
calculating a weight compensation factor of said control model from said average of said differences.

6. A method for weigh feeding material including the steps of:
storing a quantity of material in a container;
discharging said material;
sensing a weight of the stored material or the material being discharged;
selectively discharging material in a calibration mode and in a run mode;
said calibration mode comprising the steps of:
calibrating a small signal gain and a weight compensation factor of a control model which relates discharging material to an amount of control; and
calibrating a noise model including a model of at least one plant noise process and a model of at least one measurement noise process, which together cause said sensed weight to differ from an actual weight state; and
said run mode comprising the steps of:
deriving an estimate of an actual mass flow state of the material being discharged, from said sensed weight using said noise model and said control model;
determining a difference between said estimate of said actual mass flow state and a desired mass flow state;
calculating a control amount according to said difference and according to a magnitude of said difference relative to said desired mass flow state; and
controlling said discharge of material using said control amount to maintain said actual mass flow state at said desired mass flow state.

7. A method for weigh feeding material according to claim 6, wherein said calibration mode is selected before said run mode.

8. A weigh feeding system comprising:
a means for storing material;
means for discharging material from said means for storing;
means for sensing a weight of the stored material or a weight of the material being discharged;
means for deriving an estimated weight state of the material being weighed and an estimated mass flow state of the material being discharged, from said sensed weight using a Kalman filter means including a noise model of at least one noise process which causes said sensed weight to differ from an actual weight state of the material being weighed, and including a control model;
means for automatically calibrating said noise model and said control model;
means for calculating a set-point error proportional to a difference between said estimated mass flow state and a desired mass flow state;
means for calculating a weight control signal according to said set-point error and according to a magnitude of said set-point error relative to said desired mass flow state; and
means for controlling said means for discharging according to said weight control signal to discharge material from said means for storing at said desired mass flow state.

* * * * *